US012701493B2

(12) United States Patent
Shrivastava et al.

(10) Patent No.: US 12,701,493 B2
(45) Date of Patent: Aug. 4, 2026

(54) METHODS AND APPARATUSES FOR TRANSMITTING OVER SIDELINK MULTIPATH OPERATIONS

(71) Applicant: Robert Bosch GmbH, Stuttgart (DE)

(72) Inventors: Rudraksh Shrivastava, Erligheim (DE); Oliver Blume, Stuttgart (DE); Sudeep Hegde, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 349 days.

(21) Appl. No.: 18/358,180

(22) Filed: Jul. 25, 2023

(65) Prior Publication Data

US 2024/0056942 A1 Feb. 15, 2024

(30) Foreign Application Priority Data

Aug. 11, 2022 (EP) ..................................... 22190033

(51) Int. Cl.
H04W 40/22 (2009.01)
H04W 40/24 (2009.01)
(Continued)

(52) U.S. Cl.
CPC ......... H04W 40/246 (2013.01); H04W 40/22 (2013.01); H04W 76/15 (2018.02);
(Continued)

(58) Field of Classification Search
CPC ... H04W 40/246; H04W 40/22; H04W 88/04; H04W 88/02; H04W 76/15; H04W 76/27; H04W 76/28
See application file for complete search history.

(56) References Cited

U.S. PATENT DOCUMENTS

| | | | | |
|---|---|---|---|---|
| 11,438,736 B2 * | 9/2022 | Fehrenbach | .......... | H04W 72/23 |
| 2024/0064857 A1 * | 2/2024 | Wang | .................... | H04W 76/10 |
| 2024/0306246 A1 * | 9/2024 | Zhang | ............... | H04W 52/0229 |

FOREIGN PATENT DOCUMENTS

| | | | | | |
|---|---|---|---|---|---|
| EP | 4221451 A1 * | 8/2023 | | ............ | H04W 68/02 |
| WO | 2018202798 A1 | 11/2018 | | | |
| WO | WO-2022133937 A1 * | 6/2022 | | ............ | H04W 76/28 |

OTHER PUBLICATIONS

3GPP TR 23.700-33, 3rd Generation Partnership Project (3GPP), Technical Report V0.3.0 (2022), Technical Specification Group Services & System Aspects; Study on system enhancement for Proximity based Services (ProSe) in the 5G System (5GS); Phase 2; (Release 18), pp. 1-153, XP052182651.

(Continued)

*Primary Examiner* — Asad M Nawaz
*Assistant Examiner* — Sanaa Al Samahi
(74) *Attorney, Agent, or Firm* — NORTON ROSE FULBRIGHT US LLP

(57) ABSTRACT

A method, including: transmitting, by a first terminal device conducts communications with a base station directly and indirectly, over a first sidelink communication path, via a second terminal device acting as a relay. While the first sidelink communication path is active, the first terminal device transmits a request to the second terminal device via a sidelink interface using a first sidelink communication, wherein the second terminal device is configured to serve the first terminal device as a relay terminal device, over the first sidelink communication path. The first terminal device then receives a response to the request from the second terminal device. The request indicating that requests activation, for the first terminal device, of a sidelink multipath operation associated with at least one further, third, in which the first terminal device should be activated for continues to conduct communications with the base station and in which (Continued)

a message is transmitted between the first terminal device and receiving, by the base station indirectly both over the first sidelink communication path and over terminal device, a first response to the first request from the second sidelink communication path via a third terminal device terminal device.

16 Claims, 8 Drawing Sheets

(51) Int. Cl.

| | | |
|---|---|---|
| *H04W 76/15* | (2018.01) | |
| *H04W 76/27* | (2018.01) | |
| *H04W 76/28* | (2018.01) | |
| *H04W 88/02* | (2009.01) | |
| *H04W 88/04* | (2009.01) | |

(52) U.S. Cl.
CPC ........... *H04W 76/27* (2018.02); *H04W 88/02* (2013.01); *H04W 88/04* (2013.01)

(56) References Cited

OTHER PUBLICATIONS

3GPP TSG-WG SA2 Meeting #152E (2022), Huawei HiSilicon: KI#5 Sol#27 Update: Adding Support of multipath transmission via Layer-3 UE to Network Relay, pp. 1-7; XP052185028.

* cited by examiner

300 —— transmit a first request to a second terminal

—— REQ-1, SL-MP-OP

302 —— receive a first response to the first request

—— RESP-1

304 —— control, at least temporarily, an operation of the first terminal device based on the first response

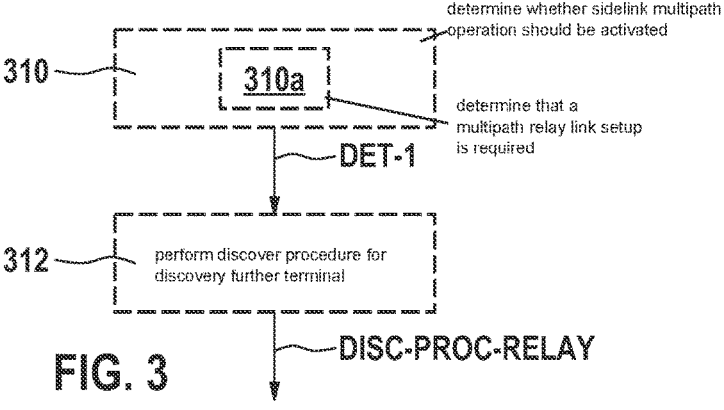

determine whether sidelink multipath operation should be activated determine that a multipath relay link setup is required

310

310a

DET-1

312 — perform discover procedure for discovery further terminal

DISC-PROC-RELAY

FIG. 3

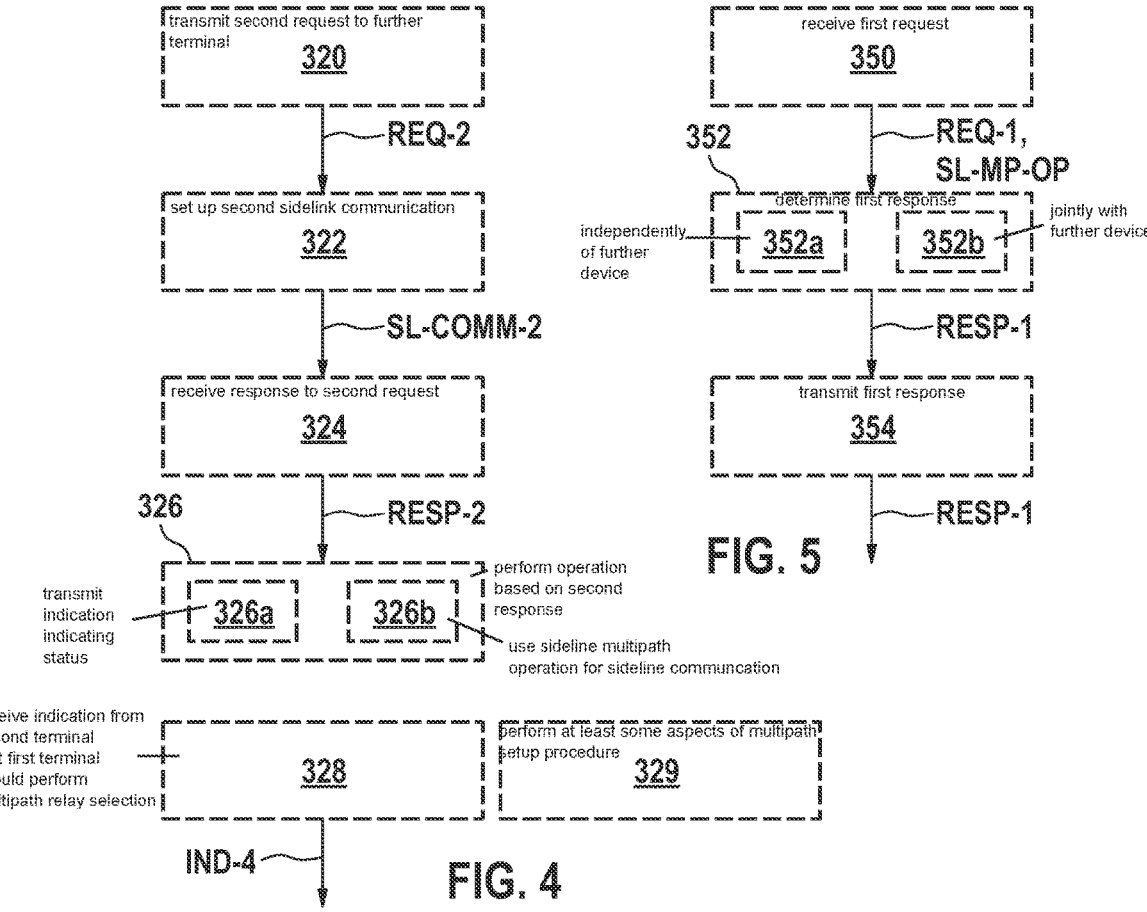

transmit second request to further terminal

320

REQ-2 set up second sidelink communication

322

SL-COMM-2 receive response to second request

324

326

RESP-2 transmit indication indicating status

326a perform operation based on second response

326b use sideline multipath operation for sideline communcation receive indication from second terminal that first terminal should perform multipath relay selection

328 perform at least some aspects of multipath setup procedure

329

IND-4

FIG. 4 receive first request

350

352

REQ-1, SL-MP-OP independently of further device determine first response

352a

352b jointly with further device

RESP-1 transmit first response

354

RESP-1

FIG. 5

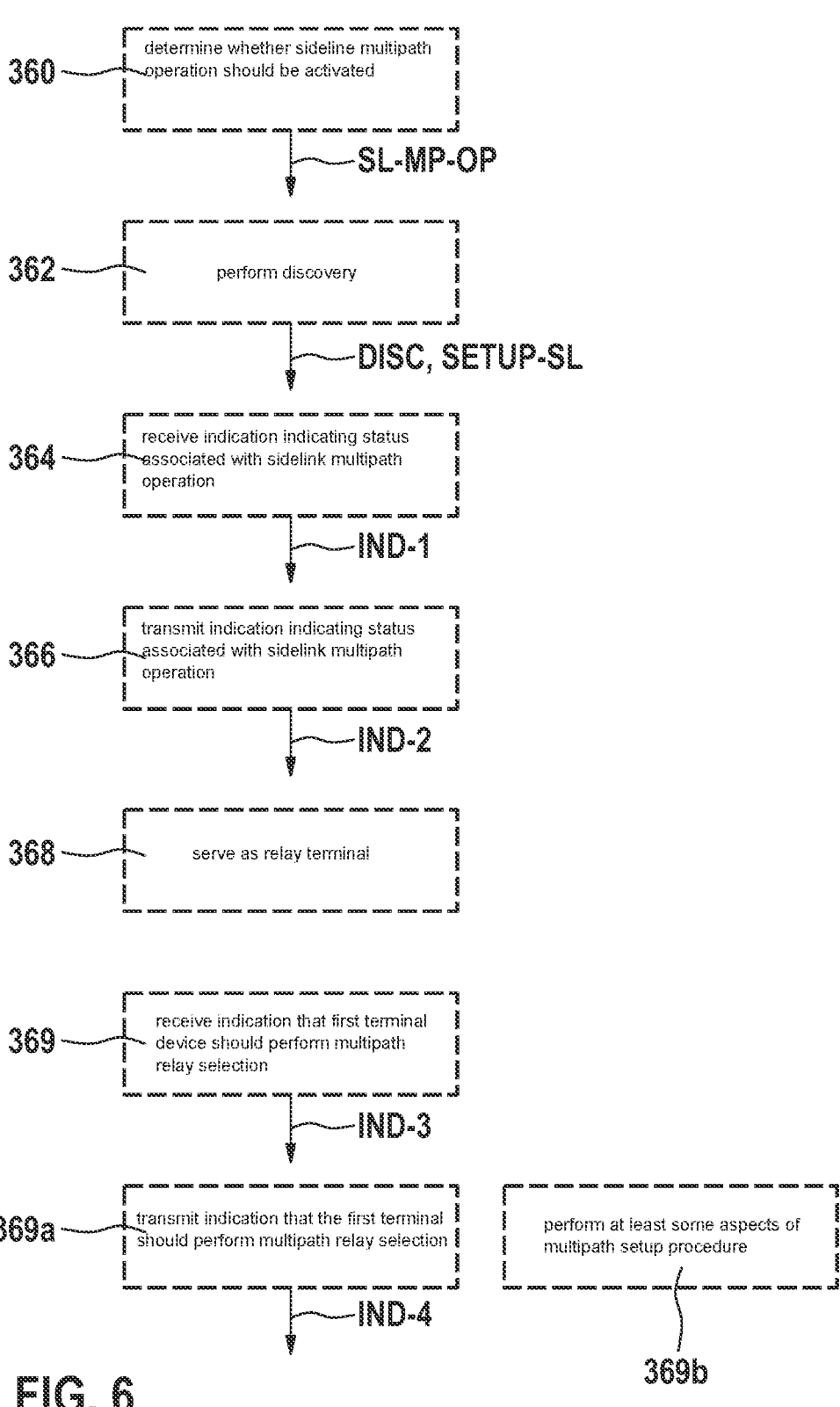

360 — determine whether sideline multipath operation should be activated

SL-MP-OP

362 — perform discovery

DISC, SETUP-SL

364 — receive indication indicating status associated with sidelink multipath operation

IND-1

366 — transmit indication indicating status associated with sidelink multipath operation

IND-2

368 — serve as relay terminal

369 — receive indication that first terminal device should perform multipath relay selection

IND-3

369a — transmit indication that the first terminal should perform multipath relay selection

IND-4 perform at least some aspects of multipath setup procedure

380 — receive request indicating second sidelink communication should be activated

REQ-2

382 — set up second sidelink communication

SL-COMM-2

384 — transmit second response

RESP-2

390 — perform discovery

DISC, SETUP-SL

392 — transmit indication indicating status associated with sidelink multipath operation

IND-2'

394 — serve a relay device

RESP-2

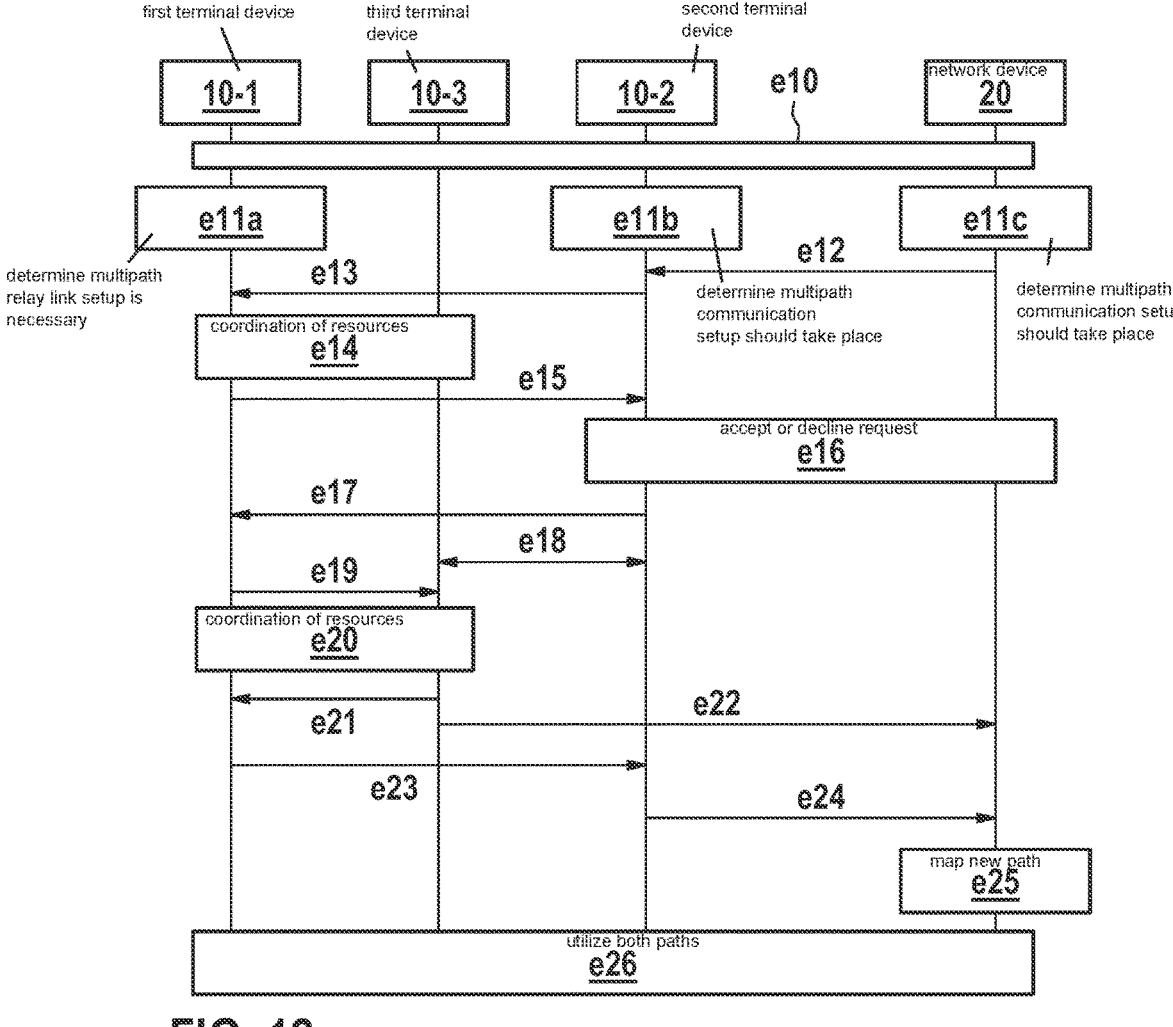

first terminal device third terminal device second terminal device network device 10-1

10-3

10-2 e10

20 e11a e11b e12 e11c determine multipath relay link setup is necessary e13 determine multipath communication setup should take place determine multipath communication setup should take place coordination of resources
e14 e15 accept or decline request
e16 e17 e18 e19 coordination of resources
e20 e21 e22 e23 e24 map new path
e25 utilize both paths
e26

FIG. 12

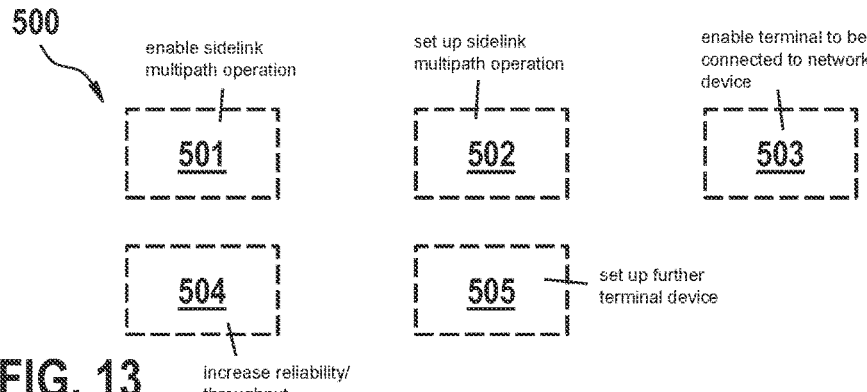

500 enable sidelink multipath operation set up sidelink multipath operation enable terminal to be connected to network device

501

502

503

504

505 set up further terminal device

FIG. 13      increase reliability/throughput

METHODS AND APPARATUSES FOR TRANSMITTING OVER SIDELINK MULTIPATH OPERATIONS

CROSS REFERENCE

The present application claims the benefit under 35 U.S.C. § 119 of European Patent Application No. EP 22 19 0033.5 filed on Aug. 11, 2022, which is expressly incorporated herein by reference in its entirety.

FIELD

The present invention relates to a method of transmitting a request to a terminal device.

The present invention further relates to an apparatus for transmitting a request to a terminal device.

SUMMARY

Exemplary embodiments of the present invention relate to a method, for example a computer-implemented method, comprising: transmitting, by a first terminal device, a first request to a second terminal device, e.g. via a sidelink interface, e.g. using a first sidelink communication, wherein the second terminal device is configured to serve (e.g., currently serves) the first terminal device as a relay terminal device, the first request indicating that a sidelink multipath operation associated with at least one further, e.g. third, terminal device should be activated for the first terminal device, and receiving, by the first terminal device, a first response to the first request from the second terminal device. In some exemplary embodiments, this enables to set up e.g. a sidelink multipath operation, wherein the first terminal device may at least temporarily be served by more than one relay terminal device, e.g. enabling the first terminal device to communicate, e.g. via at least one sidelink interface, with more than one other terminal device.

In some exemplary embodiments of the present invention, at least one of the first terminal device, the second terminal device and the third terminal device can e.g. be used with a wireless, for example cellular, communications system, which is for example based on and/or adheres at least partially to at least one third generation partnership project, 3GPP, radio standard such as 4G (fourth generation), 5G (fifth generation), 6G (sixth generation) or other radio access technology.

In some exemplary embodiments of the present invention, at least one of the first terminal device, the second terminal device and the third terminal device may be a user equipment (UE) or a data transceiver modem, which, for example, may be associated with a mobile object such as e.g. a vehicle, for example car or truck or the like.

In some exemplary embodiments of the present invention, a network device may be provided which may e.g. at least temporarily serve at least one of the first terminal device, the second terminal device and the third terminal device.

In some exemplary embodiments of the present invention, the network device may be a base station, e.g. for a wireless, for example cellular, communications system, which is for example based on and/or adheres at least partially to at least one third generation partnership project, 3GPP, radio standard such as 4G (fourth generation), 5G (fifth generation), 6G (sixth generation) or other radio access technology.

In some exemplary embodiments of the present invention, the network device may e.g. be a gNB.

In some exemplary embodiments of the present invention, the first terminal device may e.g. be a remote UE, which in some exemplary embodiments may at least temporarily be out of coverage of the network, e.g. network device.

In some exemplary embodiments of the present invention, the first terminal device may use a further terminal device, which e.g. has network coverage, e.g. the second terminal device, as a relay terminal device, e.g. as a relay to forward information, e.g. messages, to/from the network or from UE-to-UE.

In some exemplary embodiments of the present invention, the first terminal device may use the second terminal device as a, for example primary, relay terminal device.

In some exemplary embodiments of the present invention, the first terminal device may use the third terminal device as a, for example secondary, relay terminal device.

In some exemplary embodiments of the present invention, at least one of the second terminal device and the third terminal device may at least temporarily operate as a UE-to-network, U2N, relay terminal device, e.g. for the first terminal device, e.g. for connecting the, for example remote, first terminal device with the network, e.g. a gNB.

In some exemplary embodiments of the present invention, at least one of the second terminal device and the third terminal device may at least temporarily operate as a UE-to-UE, U2U, relay terminal device, e.g. for the first terminal device, e.g. for connecting the, for example remote, first terminal device with at least one other terminal device.

In some exemplary embodiments of the present invention, the first terminal device may exchange information, e.g. messages and/or data, with at least one of the second terminal device and the third terminal device, over a sidelink interface, e.g. a PC5 interface according to some accepted standard.

This way, in some exemplary embodiments of the present invention, the first terminal device may communicate with the second terminal device and the third terminal device, e.g. in the sense of a sidelink multipath operation.

In some exemplary embodiments of the present invention, the method comprises at least one of: a) determining, e.g. by the first terminal device, whether the sidelink multipath operation should be activated, b) performing a discovery procedure for discovering the at least one further, e.g. third, terminal device, wherein, for example, the at least one further, e.g. third, terminal device may potentially serve the first terminal device as a relay terminal device, e.g. a further relay terminal device, wherein, for example the sidelink multipath operation is associated with the second terminal device and the third terminal device.

In some exemplary embodiments of the present invention, the determining, e.g. by the first terminal device, whether the sidelink multipath operation should be activated may e.g. be based on at least one of: a) fluctuations in a link quality, b) prediction of link quality degradation, e.g. at a future time, c) a sidelink reference signal received power (SL-RSRP), e.g. between the first, e.g. remote, terminal device and the second, e.g. primary relay, terminal device drops below a, for example configured, threshold, d) a link quality of an air interface, e.g. Uu interface, between the second terminal device and the network device, as e.g. characterized by a Uu reference signal received power (RSRP), drops below a threshold, e) the second terminal device experiences congestion, e.g. due to serving one or more further remote UEs, e.g. other than the first terminal device.

In some exemplary embodiments of the present invention, optionally, at least one of a) the second terminal device, e.g. primary relay terminal device, and b) the network device, e.g. gNB (e.g., jointly or independently) may determine that the first, e.g. remote, terminal device should be configured with a multipath relay, e.g. multipath sidelink relay, in which case, in some exemplary embodiments, the first, e.g. remote, terminal device may e.g. be provided with an explicit indication or with an implicit indication, e.g. by the network, e.g. gNB, or by the second, e.g. primary relay, terminal device, e.g. to perform a multipath setup procedure.

In some exemplary embodiments of the present invention, the explicit indication may e.g. be a, for example new, specific message, e.g. for the purpose of multipath activation.

In some exemplary embodiments of the present invention, the explicit indication may e.g. be a, for example new, information field, e.g. information element, e.g. in at least one sidelink discovery message.

In some exemplary embodiments of the present invention, the explicit indication may e.g. be included in at least one radio resource control, RRC, message, e.g. sidelink RRC message, e.g. according to some accepted standard.

In some exemplary embodiments of the present invention, e.g. alternatively (or additionally) to the explicit indication exemplarily mentioned above, an indication for multipath link setup for the first, e.g. remote, terminal device may be done implicitly, e.g. by setting and/or varying at least one of: a) configuring quality of service, QoS, parameter configuration(s), b) QoS thresholds, e.g. if a certain target PQI/CQI and/or reliability and/or throughput etc., is desired, e.g. needed, the multipath may be setup in some exemplary embodiments.

In some exemplary embodiments of the present invention, at least one of the first terminal device, the second terminal device and the network device, e.g. gNB, may, e.g. individually or jointly, determine that the first, e.g. remote, terminal device should, e.g. must, establish a direct air interface, e.g. Uu, link to the network, e.g. gNB, or should perform a relay reselection (e.g., with a single relay UE) or establish a multipath relay link (e.g., with two or more relays simultaneously active) e.g. based on, but not limiting to, at least one of a) link quality predictions between the remote UE, relay UE and the network, b) the DRX configurations of the involved UEs, c) resource allocation constraints, and so on.

In some exemplary embodiments of the present invention, the method comprises: determining, by the first terminal device, that a multipath relay link setup is required.

In some exemplary embodiments of the present invention, the method comprises at least one of: a) transmitting, by the first terminal device, a second request to the at least one further, e.g. third, terminal device, the second request indicating to the at least one further, e.g. third, terminal device, that a, for example second, sidelink communication between the at least one further, e.g. third, terminal device and the first terminal device should be activated, e.g. for the multipath operation, b) setting up, e.g. by the first terminal device, the second sidelink communication between the at least one further, e.g. third, terminal device and the first terminal device, c) receiving, by the first terminal device, a second response to the second request from the at least one further, e.g. third, terminal device, d) performing an operation of the first terminal device based at least on the second response.

In some exemplary embodiments of the present invention, the method comprises at least one of: a) transmitting an indication, by the first terminal device, to the second terminal device, indicating a status associated with the sidelink multipath operation, e.g. whether a setup of the sidelink multipath operation is completed, b) using, by the first terminal device, the sidelink multipath operation for sidelink communication with the second terminal device and the third terminal device, e.g. for using both the second terminal device and the third terminal device as sidelink relay terminal devices, c) receiving, by the first terminal device, an indication from the second terminal device that the first terminal device should, e.g. must, perform a multipath relay selection, d) performing, by the first terminal device, e.g. at least some aspects of, a multipath setup procedure jointly with e.g. the second terminal device (e.g., using signaling, e.g. explicit signaling or implicit signaling), e.g. to establish a multipath link, e.g. with the third terminal device.

Further exemplary embodiments of the present invention relate to a method, for example a computer-implemented method, comprising: receiving, by a, for example second, terminal device, a first request from a first terminal device, e.g. via a sidelink interface, wherein the second terminal device is configured to serve the first terminal device as a relay terminal device, the first request indicating that a sidelink multipath operation associated with at least one further, e.g. third, terminal device should be activated for the first terminal device, and transmitting, by the second terminal device, a first response to the first terminal device.

In some exemplary embodiments of the present invention, the method comprises: determining, by the second terminal device, the first response, wherein for example the determining comprises one of the following aspects: a) determining the first response independently of at least one further entity, e.g. network device, b) determining the first response jointly with at least one further entity, e.g. network device, e.g. using signaling, e.g. explicit signaling (or, e.g., implicit signaling), e.g. with the at least one further entity, e.g. the gNB.

In some exemplary embodiments of the present invention, the method comprises at least one of: a) determining, by the second terminal device, whether the sidelink multipath operation should be activated, b) performing, by the second terminal device, a discovery and/or sidelink setup associated with the second terminal device and the at least one further, e.g. third, terminal device, c) receiving, by the second terminal device, an indication from the first terminal device, indicating a status associated with the sidelink multipath operation, e.g. whether a setup of the sidelink multipath operation is completed, d) transmitting, by the second terminal device, an indication, to a network device, indicating a or the status associated with the sidelink multipath operation, e.g. whether a setup of the sidelink multipath operation is completed, e) serving, by the second terminal device, the first terminal device as a relay terminal device, e.g. associated with the sidelink multipath operation, f) receiving, by the second terminal device, an indication from a network device that the first terminal device should, e.g. must, perform a multipath relay selection, g) transmitting, by the second terminal device, an indication to the first terminal device that the first terminal device should, e.g. must, perform a multipath relay selection, e.g. based on receiving the indication from the network device, h) performing, by the second terminal device, e.g. at least some aspects of, a multipath setup procedure jointly with e.g. the first terminal device, e.g. to establish a multipath link, e.g. with the third terminal device.

Further exemplary embodiments of the present invention relate to a method, for example a computer-implemented method, comprising: a) receiving, by a, for example third, terminal device, a, for example second, request from a first terminal device, wherein the first terminal device is served by a second terminal device, e.g. using a, for example first, sidelink communication, e.g. as a relay terminal device, the second request indicating to the third terminal device that a, for example second, sidelink communication between the third terminal device and the first terminal device should be activated, e.g. for a sidelink multipath operation of the first terminal device, b) setting up, e.g. by the third terminal device, the second sidelink communication between the third terminal device and the first terminal device, c) transmitting, by the third terminal device, a, for example second, response to the second request.

In some exemplary embodiments of the present invention, the method comprises at least one of: a) performing, by the third terminal device, a discovery and/or sidelink setup associated with the second terminal device and the third terminal device, b) transmitting, by the third terminal device, an indication to a network device, indicating a status associated with the sidelink multipath operation, e.g. whether a setup of the sidelink multipath operation is completed, c) serving, by the third terminal device, the first terminal device as a relay terminal device, e.g. associated with the sidelink multipath operation.

Further exemplary embodiments of the present invention relate to an apparatus, for example for a terminal device, e.g. for at least one of the first terminal device, the second terminal device, the third terminal device, for performing the method according to at least one of the above-described embodiments.

Further exemplary embodiments of the present invention relate to an apparatus, for example for a terminal device, e.g. for at least one of the first terminal device, the second terminal device, the third terminal device, comprising means, for performing the method according to at least one of the embodiments.

In some exemplary embodiments of the present invention, the apparatus and/or its functionality may, e.g., be provided within the at least one terminal device. In some exemplary embodiments, the apparatus and/or its functionality may, e.g., be provided outside of the at least one terminal device, e.g., in form of a, for example separate, device, that may e.g. be at least temporarily coupled with the at least one terminal device.

Further exemplary embodiments of the present invention relate to a method, for example a computer-implemented method, comprising at least one of: a) determining, by a network device, e.g. gNB, whether a sidelink multipath operation should be activated for a first terminal device, the first terminal device being served, using a first sidelink communication, by a second terminal device as a relay terminal device, the sidelink multipath operation being associated with at least one further, e.g. third, terminal device, b) transmitting, by the network device, an indication that the first terminal device should, e.g. must, perform a multipath relay selection, c) determining a first response to be transmitted to the first terminal device by the second terminal device, e.g. responsive to the second terminal device receiving a first request from the first terminal device, e.g. via a sidelink interface, wherein the second terminal device is configured to serve the first terminal device as a relay terminal device, the first request indicating that a sidelink multipath operation associated with at least one further, e.g. third, terminal device should be activated for the first terminal device, jointly with the second terminal device, e.g. using signaling, e.g., explicit signaling (or, e.g., implicit signaling), e.g., with the second terminal device, d) receiving, by the network device, an indication from at least one further, for example third, terminal device, indicating a status associated with the sidelink multipath operation, e.g. whether a setup of the sidelink multipath operation is completed, e) receiving, by the network device, from the second terminal device, an indication indicating a or the status associated with the sidelink multipath operation, e.g. whether a setup of the sidelink multipath operation is completed, f) performing a path configuration, e.g. duplication configuration, for the first terminal device, g) serving, by the network device, the first terminal device via at least one of the terminal devices, e.g. as relay terminal devices, e.g. associated with the sidelink multipath operation.

Further exemplary embodiments of the present invention relate to an apparatus, for example for a network device, for performing the method according to the embodiments.

Further exemplary embodiments of the present invention relate to an apparatus, for example for a network device, comprising means, for performing the method according to the embodiments.

In some exemplary embodiments of the present invention, the apparatus and/or its functionality may e.g. be provided within the network device. In some exemplary embodiments, the apparatus and/or its functionality may e.g. be provided outside of the network device, e.g. in form of a, for example separate, device, that may e.g. be at least temporarily coupled with the network device.

Further exemplary embodiments of the present invention relate to a terminal device, e.g. at least one of a) a first terminal device, e.g. at least temporarily operating as a remote terminal device, b) a second terminal device, e.g. at least temporarily operating as a primary relay terminal device, e.g. for the first terminal device, c) a third terminal device, e.g. at least temporarily operating as a secondary relay terminal device, e.g. for the first terminal device, comprising at least one apparatus according to the embodiments.

Further exemplary embodiments of the present invention relate to a network device, e.g. at least temporarily serving at least one of a) a first terminal device, e.g. at least temporarily operating as a remote terminal device, b) a second terminal device, e.g. at least temporarily operating as a primary relay terminal device, e.g. for the first terminal device, c) a third terminal device, e.g. either directly or indirectly (e.g., via one or more U2N relay terminal devices), the network device comprising at least one apparatus according to the embodiments.

Further exemplary embodiments of the present invention relate to a communication system or communication network comprising at least one apparatus according to the embodiments.

In some exemplary embodiments of the present invention, the communication system may e.g. comprise one or more terminal devices and/or one or more network devices according to the embodiments.

Further exemplary embodiments of the present invention relate to a computer program comprising instructions which, when the program is executed by a computer, cause the computer to carry out the method according to the embodiments.

Further exemplary embodiments of the present invention relate to a computer-readable storage medium comprising instructions which, when executed by a computer, cause the computer to carry out the method according to the embodiments.

Further exemplary embodiments of the present invention relate to a data carrier signal carrying and/or characterizing the computer program according to the embodiments.

Further exemplary embodiments of the present invention relate to a use of the method according to the embodiments and/or of the apparatus according to the embodiments and/or of the communication system according to the embodiments and/or of a computer program according to the embodiments and/or of a computer-readable storage medium according to the embodiments and/or of a data carrier signal according to the embodiments for at least one of: a) enabling a sidelink multipath operation, e.g. for a user equipment-to-network, U2N, relay multipath configuration, b) setting up a sidelink multipath operation, e.g. for a user equipment-to-network, U2N, relay multipath operation, c) enabling a terminal device, e.g. a remote user equipment, to be connected to a network device at least temporarily using two or more relay terminal devices, d) increasing a reliability and/or a through-put for a terminal device, e.g. remote terminal device, e) setting up at least one further, e.g. second, relay terminal device, e.g. for a first terminal device, e.g. remote terminal device.

BRIEF DESCRIPTION OF THE DRAWINGS

Some exemplary embodiments will now be described with reference to the figures.

FIG. 3 schematically depicts a simplified flow-chart according to exemplary embodiments of the present invention.

FIG. 4 schematically depicts a simplified flow-chart according to exemplary embodiments of the present invention.

FIG. 5 schematically depicts a simplified flow-chart according to exemplary embodiments of the present invention.

FIG. 6 schematically depicts a simplified flow-chart according to exemplary embodiments of the present invention.

FIG. 12 schematically depicts a simplified signaling dia-gram according to exemplary embodiments of the present invention.

FIG. 13 schematically depicts aspects of use according to exemplary embodiments of the present invention.

DETAILED DESCRIPTION OF EXAMPLE EMBODIMENTS

Figure 1:
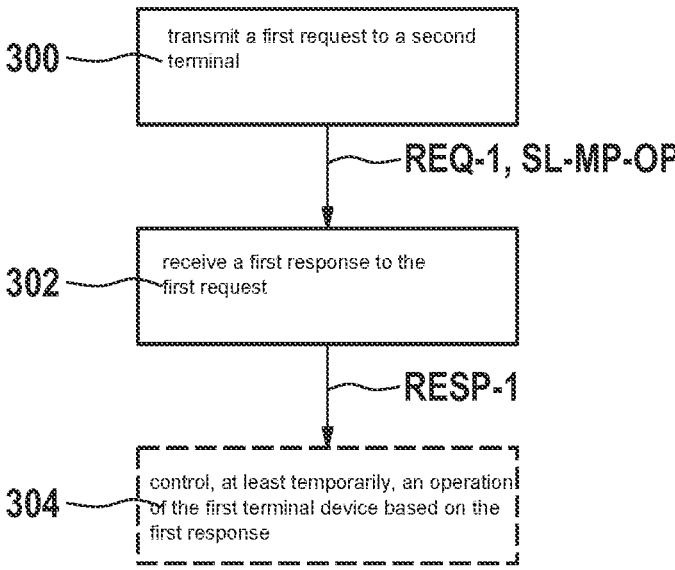
FIG. 1 schematically depicts a simplified flow-chart according to exemplary embodiments of the present invention.
Figure 2:
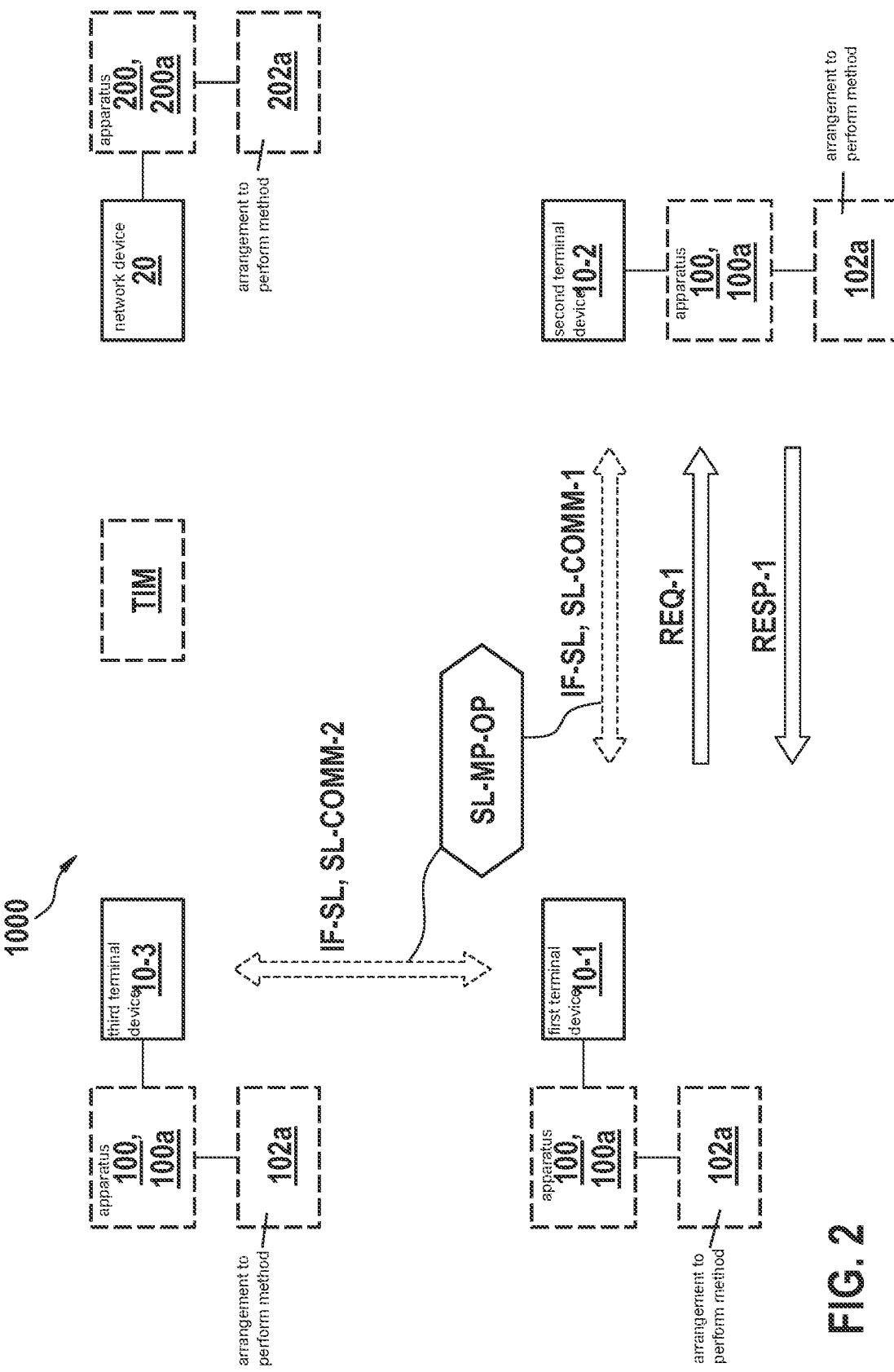
FIG. 2 schematically depicts a simplified block diagram according to exemplary embodiments of the present invention.

Exemplary embodiments, see FIG. 1, 2, relate to a method, for example a computer-implemented method, comprising: transmitting 300, by a first terminal device (10-1), a first request REQ-1 to a second terminal device 10-2, e.g. via a sidelink interface IF-SL, e.g. using a first sidelink communication SL-COMM-1, wherein the second terminal device is configured to serve (e.g., currently serves) the first terminal device 10-1 as a relay terminal device, the first request REQ-1 indicating that a sidelink multipath operation SL-MP-OP associated with at least one further, e.g. third, terminal device 10-3, e.g. over the sidelink interface IF-SL, e.g. using a second sidelink communication SL-COMM-2, should be activated for the first terminal device 10-1, and receiving 302 (FIG. 1), by the first terminal device 10-1 (FIG. 2), a first response RESP-1 to the first request REQ-1 from the second terminal device 10-2. In some exemplary embodiments, this enables to set up e.g. a sidelink multipath operation SL-MP-OP, wherein the first terminal device 10-1 may at least temporarily be served by more than one relay terminal device 10-2, 10-3, e.g. enabling the first terminal device 10-1 to communicate, e.g. via at least one sidelink interface IF-SL, with more than one other terminal device 10-2, 10-3.

In some exemplary embodiments, an operation of the first terminal device 10-1 may e.g. at least temporarily be con-trolled based on the first response RESP-1, see the optional block 304 of FIG. 1.

In some exemplary embodiments, FIG. 2, at least one of the first terminal device 10-1, the second terminal device 10-2 and the third terminal device 10-3 can e.g. be used with a wireless, for example cellular, communications system or network 1000, which is for example based on and/or adheres at least partially to at least one third generation partnership project, 3GPP, radio standard such as 4G (fourth genera-tion), 5G (fifth generation), 6G (sixth generation) or other radio access technology.

In some exemplary embodiments, at least one of the first terminal device 10-1, the second terminal device 10-2 and the third terminal device 10-3 may be a user equipment (UE) or a data transceiver modem, which, for example, may be associated with a mobile object such as e.g. a vehicle, for example car or truck or the like.

In some exemplary embodiments, a network device 20 may be provided which may e.g. at least temporarily serve at least one of the first terminal device 10-1, the second terminal device 10-2 and the third terminal device 10-3 (e.g., directly, e.g. over a Uu interface, or indirectly, e.g. using at least one relay terminal device 10-2, 10-3).

In some exemplary embodiments, the network device 20 may be a base station, e.g. for a wireless, for example cellular, communications system 1000, which is for example based on and/or adheres at least partially to at least one third generation partnership project, 3GPP, radio standard such as 4G (fourth generation), 5G (fifth generation), 6G (sixth generation) or other radio access technology.

In some exemplary embodiments, the network device 20 may e.g. be a gNB.

In some exemplary embodiments, the first terminal device 10-1 may e.g. be a remote UE, which in some exemplary embodiments may at least temporarily be out of coverage of the network 1000, e.g. network device 20.

In some exemplary embodiments, the first terminal device 10-1 may use a further terminal device, which e.g. has network coverage, e.g. the second terminal device 10-2, as a relay terminal device, e.g. as a relay to forward informa-tion, e.g. messages, to/from the network 1000 or from UE-to-UE.

In some exemplary embodiments, the first terminal device 10-1 may use the second terminal device 10-2 as a, for example primary, relay terminal device 10-2.

In some exemplary embodiments, the first terminal device 10-1 may use the third terminal 10-3 device as a, for example secondary, relay terminal device 10-3.

In some exemplary embodiments, at least one of the second terminal device 10-2 and the third terminal device 10-3 may at least temporarily operate as a UE-to-network, U2N, relay terminal device, e.g. for the first terminal device 10-1, e.g. for connecting the, for example remote, first terminal device 10-1 with the network 1000, e.g. a gNB 20 of the network 1000.

In some exemplary embodiments, at least one of the second terminal device 10-2 and the third terminal device 10-3 may at least temporarily operate as a UE-to-UE, U2U, relay terminal device, e.g. for the first terminal device 10-1, e.g. for connecting the, for example remote, first terminal device 10-1 with at least one other terminal device (not shown).

In some exemplary embodiments, FIG. 2, the first terminal device 10-1 may exchange information, e.g. messages and/or data, with at least one of the second terminal device 10-2 and the third terminal device 10-3, over a sidelink interface IF-SL, e.g. a PC5 interface according to some accepted standard.

This way, in some exemplary embodiments, the first terminal 10-1 device may communicate with the second terminal device 10-2 and the third terminal device 10-3, e.g. in the sense of a sidelink multipath operation SL-MP-OP.

In some exemplary embodiments, FIG. 3, the method comprises at least one of: a) determining 310, e.g. by the first terminal device 10-1, whether the sidelink multipath operation SL-MP-OP should be activated, b) performing 312 a discovery procedure DISC-PROC-RELAY for discovering the at least one further, e.g. third, terminal device 10-3, e.g. based on a determination DET-1 as obtained by step 310, wherein, for example, the at least one further, e.g. third, terminal device 10-3 may potentially serve the first terminal device 10-1 as a relay terminal device, e.g. a further relay terminal device (e.g., in addition to the primary relay terminal device 10-2), wherein, for example the sidelink multipath operation SL-MP-OP is associated with the second terminal device 10-2 and the third terminal device 10-3.

In some exemplary embodiments, FIG. 3, the determining 310, e.g. by the first terminal device 10-1, whether the sidelink multipath operation SL-MP-OP should be activated (or the respective determination DET-1 obtained thereby) may e.g. be based on at least one of: a) fluctuations in a link quality, b) prediction of link quality degradation, e.g. at a future time, c) a sidelink reference signal received power (SL-RSRP), e.g. between the first, e.g. remote, terminal device 10-1 and the second, e.g. primary relay, terminal device 10-2 drops below a, for example configured, threshold, d) a link quality of an air interface, e.g. Uu interface, between the second terminal device 10-2 and the network device 20, as e.g. characterized by a Uu reference signal received power (RSRP), drops below a threshold, e) the second terminal device 10-2 experiences congestion, e.g. due to serving one or more further remote UEs (not shown), e.g. other than the first terminal device.

In some exemplary embodiments, FIG. 2, optionally, at least one of a) the second terminal device, e.g. primary relay terminal device, 10-2 and b) the network device, e.g. gNB 20 (e.g., jointly or independently) may determine that the first, e.g. remote, terminal device 10-1 should be configured with a multipath relay, e.g. multipath sidelink relay, in which case, in some exemplary embodiments, the first, e.g. remote, terminal device 10-1 may e.g. be provided with an explicit indication or with an implicit indication, e.g. by the network 1000, e.g. gNB 20, or by the second, e.g. primary relay, terminal device 10-2, e.g. to perform a multipath setup procedure.

In some exemplary embodiments, the explicit indication may e.g. be a, for example new, specific message, e.g. for the purpose of multipath activation.

In some exemplary embodiments, the explicit indication may e.g. be a, for example new, information field, e.g. information element, e.g. in at least one sidelink discovery message that may e.g. at least temporarily be exchanged between at least one of the first terminal device 10-1, the second terminal device 10-2, and the third terminal device 10-3.

In some exemplary embodiments, the explicit indication may e.g. be included in at least one radio resource control, RRC, message, e.g. sidelink RRC message, e.g. associated with the sidelink interface IF-SL, e.g. according to some accepted standard.

In some exemplary embodiments, e.g. alternatively (or additionally) to the explicit indication exemplarily mentioned above, an indication for multipath link setup for the first, e.g. remote, terminal device 10-1 may be done implicitly, e.g. by setting and/or varying at least one of: a) configuring quality of service, QoS, parameter configuration(s), b) QoS thresholds, e.g. if a certain target PQI/CQI and/or reliability and/or throughput etc., is desired, e.g. needed, the multipath may be setup in some exemplary embodiments.

In some exemplary embodiments, FIG. 2, at least one of the first terminal device 10-1, the second terminal device 10-2 and the network device, e.g. gNB, 20 may, e.g. individually or jointly, determine that the first, e.g. remote, terminal device 10-1 should, e.g. must, establish a direct air interface, e.g. Uu, link to the network 1000, e.g. gNB 20, or should perform a relay reselection (e.g., with a single relay terminal device 10-2 or 10-3, for example) or establish a multipath relay link (e.g., with two or more relays, e.g. relay terminal devices, 10-2, 10-3 simultaneously active) e.g. based on, but not limiting to, at least one of a) link quality predictions between the remote UE 10-1, relay UE 10-2 and the network 1000, e.g. gNB 20, b) the DRX configurations of the involved UEs 10-1, 10-2, c) resource allocation constraints, and so on.

In some exemplary embodiments, FIG. 3, the method comprises: determining 310*a*, by the first terminal device 10-1, that a multipath relay link setup is required.

In some exemplary embodiments, FIG. 4, the method comprises at least one of: a) transmitting 320, by the first terminal device 10-1, a second request REQ-2 to the at least one further, e.g. third, terminal device 10-3, the second request REQ-2 indicating to the at least one further, e.g. third, terminal device 10-3, that a, for example second, sidelink communication SL-COMM-2 (FIG. 2) between the at least one further, e.g. third, terminal device 10-3 and the first terminal device 10-1 should be activated, e.g. for the multipath operation SL-MP-OP, b) setting up 322, e.g. by the first terminal device 10-1, the second sidelink communication SL-COMM-2 between the at least one further, e.g. third, terminal device 10-3 and the first terminal device SL-COMM-2, c) receiving 324, by the first terminal device 10-1, a second response RESP-2 to the second request REQ-2 from the at least one further, e.g. third, terminal device 10-3, d) performing 326 an operation of the first terminal device 10-1 based at least on the second response RESP-2.

In some exemplary embodiments, FIG. 4, the method comprises at least one of: a) transmitting 326*a* an indication, by the first terminal device 10-1, to the second terminal device 10-2, indicating a status associated with the sidelink multipath operation SL-MP-OP, e.g. whether a setup of the sidelink multipath operation is completed, b) using 326*b*, by the first terminal device 10-1, the sidelink multipath operation SL-MP-OP for sidelink communication SL-COMM-1, SL-COMM-2 with the second terminal device 10-2 and the third terminal device 10-3, e.g. for using both the second terminal device 10-2 and the third terminal device 10-3 as sidelink relay terminal devices 10-2, 10-3, c) receiving 328, by the first terminal device 10-1, an indication IND-4 from the second terminal device 10-2 that the first terminal device 10-1 should, e.g. must, perform a multipath relay selection, d) performing 329, by the first terminal device 10-1, e.g. at least some aspects of, a multipath setup procedure jointly with e.g. the second terminal device 10-2 (e.g., using signaling, e.g. explicit signaling or implicit signaling), e.g. to establish a multipath link, e.g. with the third terminal device 10-3.

In some exemplary embodiments, the receiving 328 of the indication IND-4 may e.g. be performed alternatively and/or additionally to the determination 310 of FIG. 3, e.g. prior to transmitting 300 (FIG. 1) the first request REQ-1.

Further exemplary embodiments, FIG. 5, relate to a method, for example a computer-implemented method, comprising: receiving 350, by a, for example second, terminal device 10-2 (FIG. 2), a first request REQ-1 from a first terminal device 10-1, e.g. via a sidelink interface IF-SL, wherein the second terminal device 10-2 is configured to serve the first terminal device 10-1 as a relay terminal device, e.g. as a primary relay terminal device 10-2, the first request REQ-1 indicating that a sidelink multipath operation SL-MP-OP associated with at least one further, e.g. third, terminal device 10-3 should be activated for the first terminal device 10-1, and transmitting 354 (FIG. 5), by the second terminal device 10-2, a first response RESP-1 to the first terminal device 10-1.

In some exemplary embodiments, FIG. 5, the method comprises: determining 352, by the second terminal device 10-2, the first response RESP-1, e.g. upon receiving 350 the first request REQ-1, wherein for example the determining 352 comprises one of the following aspects: a) determining 352*a* the first response RESP-1 independently of at least one further entity, e.g. network device 20, b) determining 352*b* the first response RESP-1 jointly with at least one further entity, e.g. network device 20, e.g. using signaling, e.g. explicit signaling (or, e.g., implicit signaling), e.g. with the at least one further entity, e.g. the gNB 20.

In some exemplary embodiments, FIG. 6, the method comprises at least one of: a) determining 360, by the second terminal device 10-2, whether the sidelink multipath operation SL-MP-OP should be activated, b) performing 362, by the second terminal device 10-2, a discovery DISC and/or sidelink setup SETUP-SL associated with the second terminal device 10-2 and the at least one further, e.g. third, terminal device 10-3, c) receiving 364, by the second terminal device 10-2, an indication IND-1 from the first terminal device 10-1, indicating a status associated with the sidelink multipath operation SL-MP-OP, e.g. whether a setup of the sidelink multipath operation is completed, d) transmitting 366, by the second terminal device 10-2, an indication IND-2, to a network device 20, indicating a or the status associated with the sidelink multipath operation SL-MP-OP, e.g. whether a setup of the sidelink multipath operation is completed, e) serving 368, by the second terminal device 10-2, the first terminal device 10-1 as a relay terminal device, e.g. associated with the sidelink multipath operation SL-MP-OP, f) receiving 369, by the second terminal device 10-2, an indication IND-3 from a network device 20 that the first terminal device 10-1 should, e.g. must, perform a multipath relay selection, g) transmitting 369*a*, by the second terminal device 10-2, an indication IND-4 to the first terminal device 10-1 that the first terminal device 10-1 should, e.g. must, perform a multipath relay selection, e.g. based on receiving 369 the indication IND-3 from the network device 20, h) performing 369*b*, by the second terminal device 10-2, e.g. at least some aspects of, a multipath setup procedure jointly with e.g. the first terminal device 10-1, e.g. to establish a multipath link, e.g. with the third terminal device 10-3.

Figure 7:
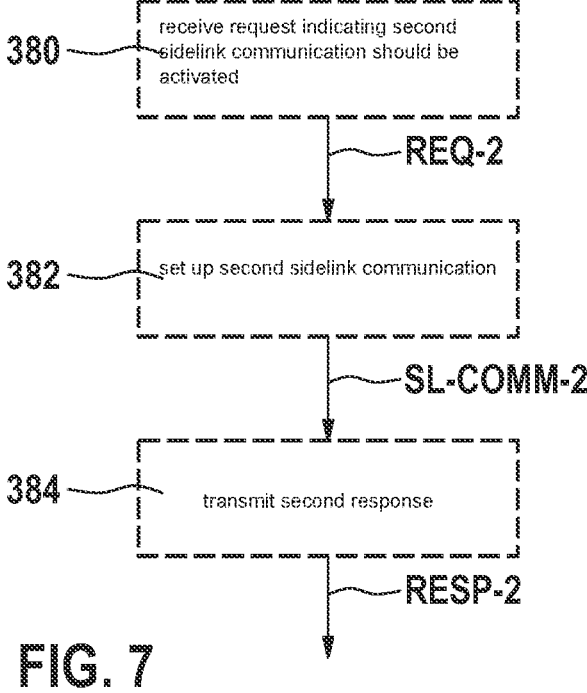
FIG. 7 schematically depicts a simplified flow-chart according to exemplary embodiments of the present invention.

Further exemplary embodiments, FIG. 7, relate to a method, for example a computer-implemented method, comprising: a) receiving 380, by a, for example third, terminal device 10-3 (FIG. 2), a, for example second, request REQ-2 from a first terminal device 10-1, wherein the first terminal device 10-1 is served by a second terminal device 10-2, e.g. using a, for example first, sidelink communication SL-COMM-1, e.g. as a relay terminal device 10-2, the second request REQ-2 indicating to the third terminal device 10-3 that a, for example second, sidelink communication SL-COMM-2 between the third terminal device 10-3 and the first terminal device 10-1 should be activated, e.g. for a sidelink multipath operation SL-MP-OP of the first terminal device 10-1, b) setting up 382, e.g. by the third terminal device 10-3, the second sidelink communication SL-COMM-2 between the third terminal device 10-3 and the first terminal device 10-3, c) transmitting 384, by the third terminal device 10-3, a, for example second, response RESP-2 to the second request REQ-2.

Figure 8:
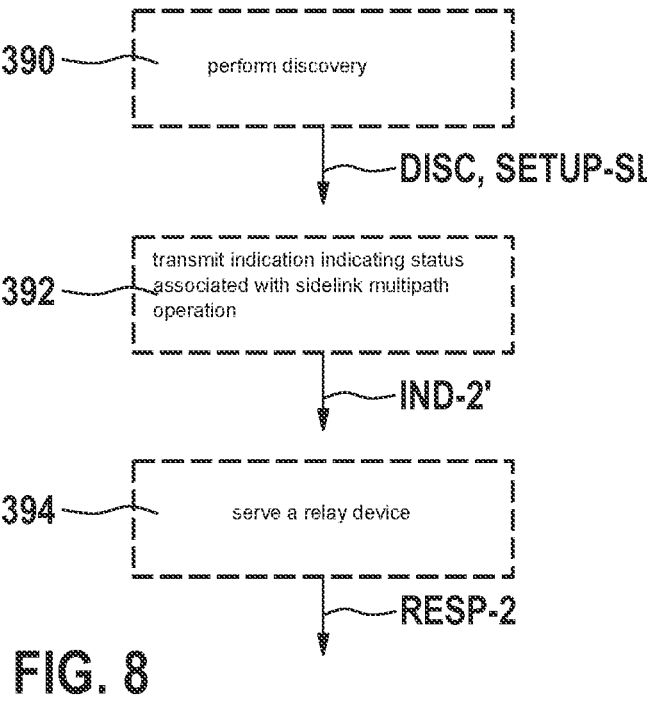
FIG. 8 schematically depicts a simplified flow-chart according to exemplary embodiments of the present invention.

In some exemplary embodiments, FIG. 8, the method comprises at least one of: a) performing 390, by the third terminal device 10-3, a discovery DISC and/or sidelink setup SETUP-SL associated with the second terminal device 10-2 and the third terminal device 10-3, b) transmitting 392, by the third terminal device 10-3, an indication IND-2' to a network device 20, indicating a status associated with the sidelink multipath operation SL-MP-OP, e.g. whether a setup of the sidelink multipath operation is completed, c) serving 394, by the third terminal device 10-3, the first terminal device 10-1 as a relay terminal device 10-3, e.g. as a secondary relay terminal device 10-3, e.g. associated with the sidelink multipath operation SL-MP-OP.

Further exemplary embodiments, FIG. 2, relate to an apparatus 100, for example for a terminal device, e.g. for at least one of the first terminal device 10-1, the second terminal device 10-2, the third terminal device 10-3, for performing the method according to at least one of the above-described embodiments.

Further exemplary embodiments relate to an apparatus 100*a*, for example for a terminal device, e.g. for at least one of the first terminal device 10-1, the second terminal device 10-2, the third terminal device 10-3, comprising means 102*a*, for performing the method according to at least one of the above-described embodiments.

In some exemplary embodiments, FIG. 2, the apparatus 100, 100*a* and/or its functionality may e.g. be provided within the at least one terminal device 10-1, 10-2, 10-3. In some exemplary embodiments, the apparatus 100, 100*a* and/or its functionality may e.g. be provided outside of the at least one terminal device 10-1, 10-2, 10-3, e.g. in form of a, for example separate, device, that may e.g. be at least temporarily coupled with the at least one terminal device 10-1, 10-2, 10-3.

Figure 9:
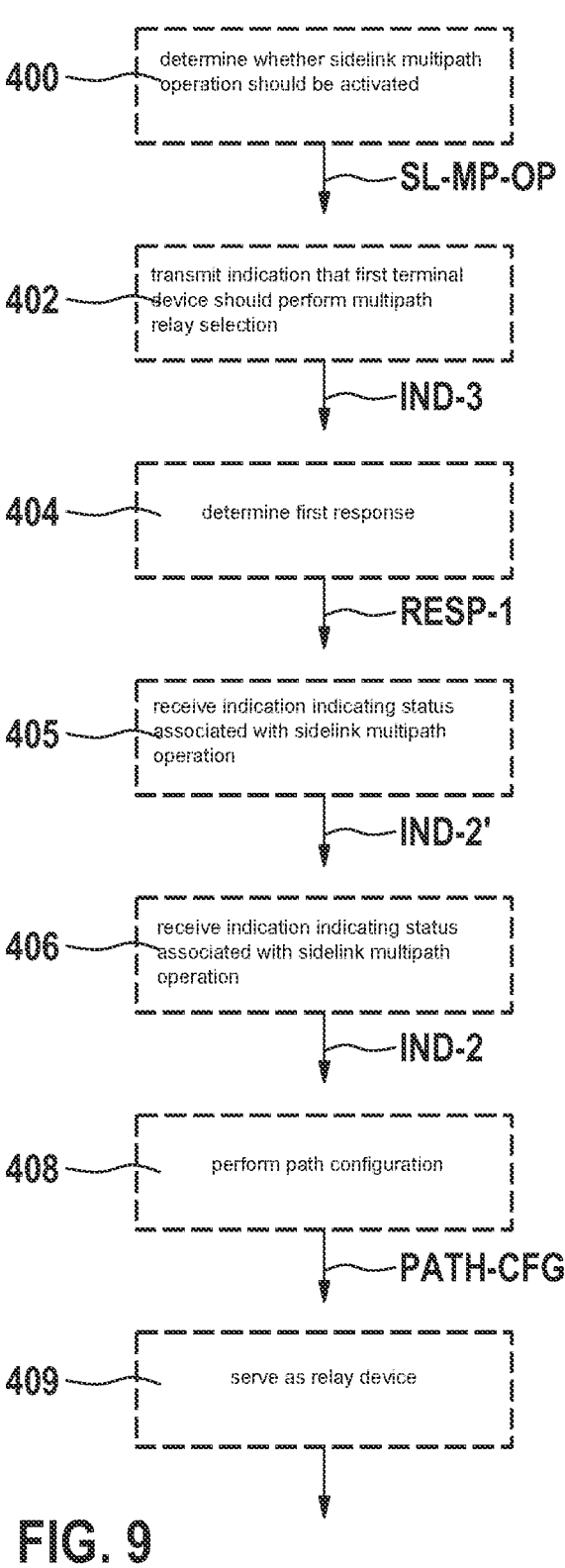
FIG. 9 schematically depicts a simplified flow-chart according to exemplary embodiments of the present invention.

Further exemplary embodiments, FIG. 9, relate to a method, for example a computer-implemented method, comprising at least one of: a) determining 400, by a network device, e.g. gNB, 20 (FIG. 2) whether a sidelink multipath operation SL-MP-OP should be activated for a first terminal device 10-1, the first terminal device 10-1 being served, using a first sidelink communication SL-COMM-1, by a second terminal device 10-2 as a relay terminal device, the sidelink multipath operation SL-MP-OP being associated with at least one further, e.g. third, terminal device 10-3, b) transmitting 402, by the network device 20, an indication IND-3 that the first terminal device 10-1 should, e.g. must, perform a multipath relay selection, c) determining 404 a first response RESP-1 to be transmitted to the first terminal device 10-1 by the second terminal device 10-2, e.g. responsive to the second terminal device 10-2 receiving 350 (FIG. 5) a first request REQ-1 from the first terminal device 10-1, e.g. via a sidelink interface IF-SL, wherein the second terminal device 10-2 is configured to serve the first terminal device 10-1 as a relay terminal device, the first request REQ-1 indicating that a sidelink multipath operation SL-MP-OP associated with at least one further, e.g. third, terminal device 10-3 should be activated for the first terminal device 10-1, jointly with the second terminal device 10-2, e.g. using signaling, e.g. explicit signaling (or, e.g., implicit signaling), e.g. with the second terminal device 10-2, d) receiving 405, by the network device 20, an indication IND2' from at least one further, for example third, terminal device 10-3, indicating a status associated with the sidelink multipath operation SL-MP-OP, e.g. whether a setup of the sidelink multipath operation is completed, e) receiving 406, by the network device 20, from the second terminal device 10-2, an indication IND-2 indicating a or the status associated with the sidelink multipath operation SL-MP-OP, e.g. whether a setup of the sidelink multipath operation is completed, f) performing 408 a path configuration PATHG-CFG, e.g. duplication configuration, for the first terminal device 10-1, g) serving 409, by the network device 20, the first terminal device 10-1 via at least one of the terminal devices 10-2, 10-3, e.g. as relay terminal devices 10-2, 10-3, e.g. associated with the sidelink multipath operation SL-MP-OP.

Further exemplary embodiments, FIG. 2, relate to an apparatus 200, for example for a network device 20, for performing the method according to the embodiments.

Further exemplary embodiments relate to an apparatus 200a, for example for a network device 20, comprising means 202a, for performing the method according to the embodiments.

In some exemplary embodiments, the apparatus 200, 200a and/or its functionality may e.g. be provided within the network device 20. In some exemplary embodiments, the apparatus 200, 200a and/or its functionality may e.g. be provided outside of the network device 20, e.g. in form of a, for example separate, device, that may e.g. be at least temporarily coupled with the network device 20.

Further exemplary embodiments, FIG. 2, relate to a terminal device, e.g. at least one of a) a first terminal device 10-1, e.g. at least temporarily operating as a remote terminal device, b) a second terminal device 10-2, e.g. at least temporarily operating as a primary relay terminal device, e.g. for the first terminal device 10-1, c) a third terminal device 10-3, e.g. at least temporarily operating as a secondary relay terminal device, e.g. for the first terminal device 10-1, comprising at least one apparatus 100, 100a according to the embodiments.

Further exemplary embodiments relate to a network device 20, e.g. at least temporarily serving at least one of a) a first terminal device 10-1, e.g. at least temporarily operating as a remote terminal device, b) a second terminal device 10-2, e.g. at least temporarily operating as a primary relay terminal device, e.g. for the first terminal device 10-1, c) a third terminal device 10-3, e.g. either directly or indirectly (e.g., via one or more U2N relay terminal devices), the network device 20 comprising at least one apparatus 200, 200a according to the embodiments.

Further exemplary embodiments, FIG. 2, relate to a communication system or communication network 1000 comprising at least one apparatus 100, 100a, 200, 200a according to the embodiments.

In some exemplary embodiments, the communication system or network 1000 may e.g. comprise one or more terminal devices 10-1, 10-2, 10-3 and/or one or more network devices 20 according to the embodiments.

Figure 10:
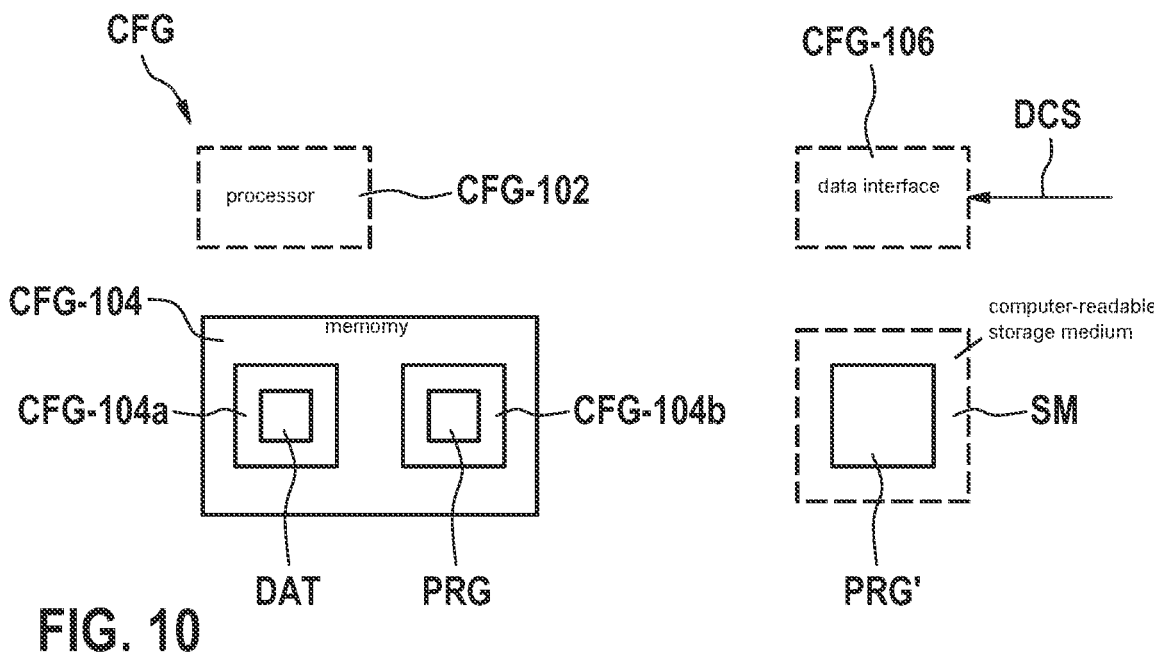
FIG. 10 schematically depicts a simplified block diagram according to exemplary embodiments of the present invention.

FIG. 10 schematically depicts a simplified block diagram of a configuration CFG according to further exemplary embodiments. In some exemplary embodiments, the depicted configuration CFG may e.g. be used for implementing at least one of the apparatus 100, 100a, 200, 200a according to the embodiments.

In some exemplary embodiments, the configuration CFG comprises at least one calculating unit, e.g. processor, CFG-102 and at least one memory unit CFG-104 associated with (i.e., usably by) the at least one calculating unit CFG-102, e.g. for at least temporarily storing a computer program PRG and/or data DAT, wherein the computer program PRG is e.g. configured to at least temporarily control an operation of the configuration CFG, e.g. for (e.g., within) at least one apparatus 100, 100a, 200, 200a, such as e.g. the execution of a method according to some exemplary embodiments.

In some exemplary embodiments, the at least one calculating unit CFG-102 comprises at least one core (not shown) for executing the computer program PRG or at least parts thereof, e.g. for executing the method according to the embodiments or at least one or more steps and/or other aspects thereof.

According to further exemplary embodiments, the at least one calculating unit CFG-102 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor, a graphics processing unit (GPU). According to further preferred embodiments, any combination of two or more of these elements is also possible.

According to further exemplary embodiments, the memory unit CFG-104 comprises at least one of the following elements: a volatile memory CFG-104a, e.g. a random-access memory (RAM), a non-volatile memory CFG-104b, e.g. a Flash-EEPROM.

In some exemplary embodiments, the computer program PRG is at least temporarily stored in the non-volatile memory CFG-104b. Data CFG-DAT (e.g. associated with at least one of the first request REQ-1 and/or the second request REQ-2 and/or the first response RESP-1 and/or the second response RESP-2 and/or at least one of the indications IND-1, IND-2, IND-2', IND-3, IND-4 and the like), which may e.g. be used for executing the method according to some exemplary embodiments, may at least temporarily be stored in the RAM CFG-104a.

In some exemplary embodiments, an optional computer-readable storage medium SM comprising instructions, e.g. in the form of a further computer program PRG', may be provided, wherein the further computer program PRG', when executed by a computer, i.e. by the calculating unit CFG-102, may cause the computer CFG-102 to carry out the method according to the embodiments. As an example, the storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

In some exemplary embodiments, the configuration CFG may comprise an optional data interface CFG-106, e.g. for bidirectional data exchange with an external device (not shown). As an example, by means of the data interface CFG-106, a data carrier signal DCS may be received, e.g. from the external device, for example via a wired or a wireless data transmission medium, e.g. over a (virtual) private computer network and/or a public computer network such as e.g. the Internet.

In some exemplary embodiments, the data carrier signal DCS may represent or carry the computer program PRG, PRG' according to the embodiments, or at least a part thereof.

Further exemplary embodiments relate to a computer program PRG, PRG' comprising instructions which, when the program is executed by a computer CFG-102, cause the computer CFG-102 to carry out the method according to the embodiments.

Figure 11:
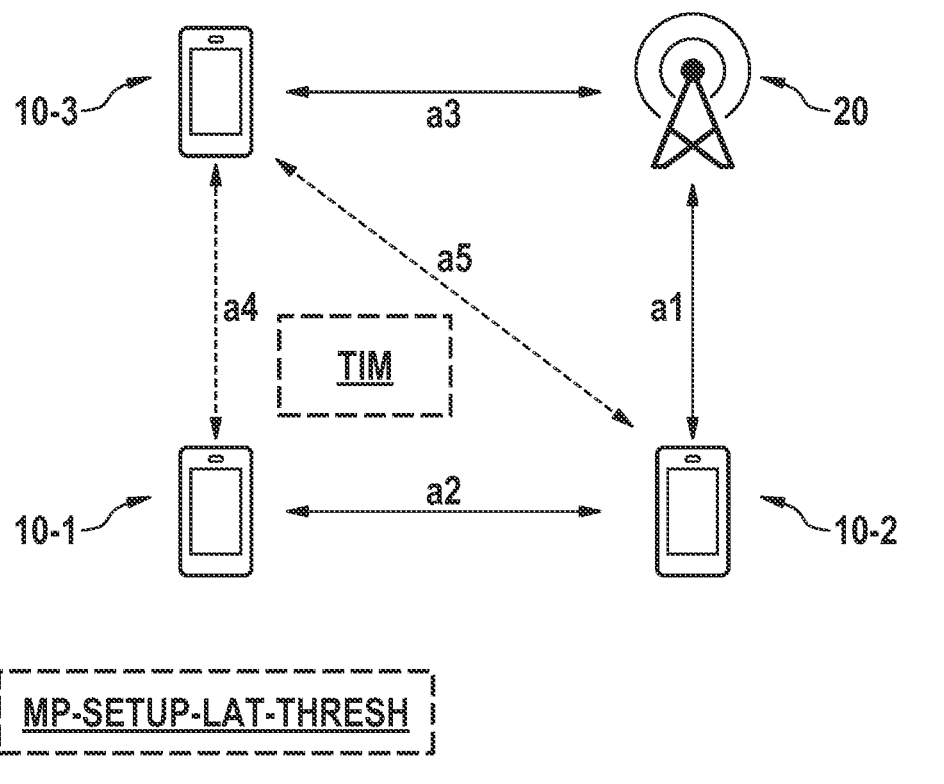
FIG. 11 schematically depicts a simplified scenario according to exemplary embodiments of the present invention.

FIG. 11 schematically depicts a simplified scenario according to exemplary embodiments. Depicted is a remote UE 10-1 currently being served by a UE-to-Network (U2N) relay-UE 10-2, e.g. to provide connectivity towards the network 1000 (FIG. 2). In some exemplary embodiments, the remote UE 10-1 does not have a direct link (e.g., based on a Uu interface) to the network, e.g. gNB 20, but e.g. only an active sidelink (e.g., SL/PC5) interface a2 to the relay UE 10-2. The relay UE 10-2 has an active Uu interface a1 to the network, e.g. gNB 20, which the relay UE 10-2 uses to relay the transmissions of remote UE 10-1. Double arrow a3 symbolizes a Uu interface of a further terminal device 10-3, e.g. a potential (further) relay UE for the remote UE 10-1, and double arrow a4 symbolizes a potential sidelink (e.g., SL/PC5) interface from the remote UE 10-1 to the potential further relay UE 10-3.

FIG. 12 schematically depicts a simplified signaling diagram according to exemplary embodiments, wherein at least some aspects of the signaling diagram of FIG. 12 may e.g. be used for the configuration of FIG. 11 and/or for the network 1000 of FIG. 2.

Elements 10-1, 10-2, 10-3, 20 of FIG. 12 correspond with the terminal devices 10-1, 10-2, 10-3 explained above and with the gNB 20 explained above, respectively.

Element e10 of FIG. 12 exemplarily symbolizes that the remote UE 10-1 (see also FIG. 2, 11) is served by a primary relay UE 10-2, e.g. a layer 2 (L2) U2N relay, to communicate with the gNB 20 (e.g., representing the network 1000). Therefore, in some exemplary embodiments, a sidelink connection exists between the remote UE 10-1 and the primary relay UE 10-2, also see, for example, the first sidelink communication SL-COMM-1 of FIG. 2. in some exemplary embodiments, no sidelink exists (e.g., yet) between the remote UE 10-1 and a candidate relay UE 10-3, e.g. as well as between primary relay UE 10-2 and candidate relay UE 10-3.

Element e11a of FIG. 12 exemplarily symbolizes the remote UE 10-1 determining that a multipath relay link setup is necessary for e.g. due to fluctuations in link quality or prediction of link quality degradation at a future time. In some exemplary embodiments, the determination e11a may e.g. be done for example based on a) when the SL-RSRP between the remote UE 10-1 and the primary relay UE 10-2 drops below a configured threshold or b) if a Uu link quality (e.g., Uu RSRP) of the primary relay UE 10-2 drops below a threshold. Another example could be when the relay UE 10-2 experiences congestion, e.g. due to serving many other remote UEs (not shown).

Optionally, the primary relay UE 10-2, see element e11b of FIG. 12, and/or the gNB 20, see element e11c of FIG. 12, e.g. jointly or independently, may determine that the remote UE 10-1 should be configured with a multipath relay, in which case the remote UE 10-1 may e.g. be provided with an explicit or implicit indication by the network 1000, e.g. gNB 20, or by the primary relay UE 10-2 to perform multipath setup procedure.

In some exemplary embodiments, the explicit indication may e.g. be a, for example new, specific message for the purpose of multipath activation, or it may be a, for example new, information field in the sidelink discovery messages, or it may be included in one or more sidelink RRC messages.

In some exemplary embodiments, e.g. alternatively, the indication for multipath link setup for the remote UE 10-1 may be done implicitly by setting or varying configuring QoS parameter configurations/thresholds e.g. if a certain target PQI/CQI, reliability or throughput etc., is needed, the multipath may be setup.

In some exemplary embodiments, the remote UE 10-1 and/or the relay UE 10-2 and/or the gNB 20 may, e.g. either individually or jointly, determine that the remote UE 10-1 should, e.g. must, establish a direct Uu link to the network, e.g. gNB 20, or perform a relay reselection (e.g., with a single relay UE) or establish multipath relay link (two or more relays 10-2, 10-3 simultaneously active) based on, but not limited to, at least one factor such as a) link quality predictions between the remote UE 10-1, relay UE 10-2 and the network 1000, b) the DRX configurations of the involved UEs, c) resource allocation constraints and so on.

Element e12 of FIG. 12 exemplarily symbolizes the gNB indicating to the relay UE 10-2 that the remote UE 10-1 should, e.g. must, perform a multipath relay selection.

Element e13 of FIG. 12 exemplarily symbolizes the relay UE 10-2 indicating to the remote UE 10-1 that the remote UE 10-1 should, e.g. must, perform a multipath relay selection, e.g. based on and/or responsive to the indication e12 from the gNB 20.

In some exemplary embodiments, e.g. when it is determined that multipath setup needs to take place (see, for example at least one of the blocks e11a, e11b, e11c), the remote UE 10-1 is triggered, see element e14, to perform a Relay Discovery (RD), e.g. to find potential relay UE candidates, such as e.g. the third terminal device 10-3, e.g. for U2N relay, e.g. for multi-path link setup, see for example also the element SL-MP-OP of FIG. 2.

In some exemplary embodiments, the first terminal device, e.g. remote UE, 10-1 performs, e.g. at least some aspects of, a multipath setup procedure jointly with e.g. the second terminal device, e.g. (primary) relay UE, 10-2 (e.g., using signaling, e.g. explicit signaling or implicit signaling), e.g. to establish a multipath link, e.g. with the third terminal device, e.g. further relay UE, 10-3, see for example elements e13, e14 of FIG. 12.

In some exemplary embodiments, the second terminal device, e.g. (primary) relay UE, 10-2 performs, e.g. at least some aspects of, the multipath setup procedure jointly with e.g. the first terminal device, e.g. remote UE, 10-1 (e.g., using signaling, e.g. explicit signaling or implicit signaling), e.g. to establish a multipath link, e.g. with the third terminal device, e.g. further relay UE, 10-3, see for example elements e13, e14 of FIG. 12.

In some exemplary embodiments, the Relay Discovery of remote UE 10-1 may e.g. be based on a discovery model-A (e.g., remote UE 10-1 monitors RD announcements over SL (sidelink), e.g. to discover potential Relay UE 10-3, e.g. in proximity) or based on a discovery model B (where remote UE 10-1 e.g. initiates a RD solicitation message, e.g. over SL, e.g. to discover those relay UE candidates 10-3 which respond to the RD solicitation message from remote UE 10-1). In some exemplary embodiments, the remote UE 10-1 may use model-A or model-B based on its own choice or as configured by the gNB 20 or as indicated by the relay UE 10-2.

In some exemplary embodiments, optionally, the primary relay UE 10-2 may perform candidate relay discovery, e.g. on behalf of the remote UE 10-1, and may e.g. indicate to the remote UE 10-1 that it should, e.g. must, establish sidelink to the candidate relay UE 10-3.

In some exemplary embodiments, e.g. in another option, the primary relay UE 10-2 may inform a candidate relay UE 10-3 to establish sidelink to the remote UE 10-1, e.g. either directly or through the network.

In some exemplary embodiments, see, for example block e14 of FIG. 12, the remote UE 10-1 may discover multi-path relay UE candidate(s) 10-3 with context information which may comprise at least one of: a) explicit indication, e.g. asking only relays which can support multipath operation, e.g. to respond to its discovery requests, b) the Remote UE 10-1 may also indicate its multipath setup status (e.g., Uu and/or SL multipath) or any other existing/on-going SL multipath connections it has with other relay UEs with or without the primary Relay UE L2 ID. It can also provide its Uu RSRP status or the Uu RSRP status of the primary Relay UE (s), c) the relay service (e.g., L2 (layer 2)/L3 (layer 3) relay) the multipath relay extension candidate UE 10-3 provides, d) the SL L2 ID of the candidate relay UE 10-3, e.g. when it has been discovered or, for example, when it has been provided by the existing relay UE 10-2 or the network, e) Out of Coverage (OoC), In-Coverage (IC) state of the UE 10-3 (e.g., PLMN ID and Cell ID of a serving network and serving cell of UE 10-3, and e.g. an RRC state of the UE 10-3, e.g. in case the UE 10-3 is in-coverage), f) any, for example additional, information that may be used, e.g. needed, e.g. DRX cycle information, battery state CSI, AI model related information (e.g. model type, update time, parameters etc.), relay capacity or load, relay capability information.

In some exemplary embodiments, e.g. once it is determined (see, for example blocks e11a, e11b, e11c), that the multipath connection setup should take place, the remote UE 10-1 transmits a sidelink multipath activation request, see element e15 of FIG. 12, to the primary relay UE 10-2, e.g. in the form of or at least similar to the first request of FIG. 1, block 300.

In some exemplary embodiments, the message or request e15 may e.g. be an explicit indication, e.g. for the purpose of multipath activation, or, in some other exemplary embodiments, it may be a new information field in at least one sidelink discovery message (e.g., model-A or model-B discovery, e.g. according to some accepted standard), or it may e.g. be included in at least one sidelink RRC message.

In some exemplary embodiments, the message or request e15 may e.g. be signaled implicitly, e.g. as follows: In some exemplary embodiments, e.g. alternatively, an indication for multipath link setup for the remote UE 10-1 may be done implicitly, e.g. by setting or varying configured QoS parameters/thresholds, e.g. if a certain target PQI/CQI, reliability, of throughput etc. is met, or by triggering or expiry of associated timers.

In some exemplary embodiments, the remote UE 10-1 may indicate one or more candidate relay UEs 10-3, e.g. organized in form of a list, it has already discovered or UEs with which remote UE 10-1 has already established SL and provide the related information to primary relay UE 10-2 in a sidelink multipath setup request message e15, REQ-1, e.g. as explained above In some exemplary embodiments, the sidelink multipath setup request message e15, REQ-1 may include at least one of: a) a list of potential target multi-path relay UE(n) 10-3, e.g. with priority values (the primary relay UE 10-2 may e.g. select the target multi-path relay UE(n) 10-3 of its own choice for the remote UE 10-1, or may e.g. provide recommendations), and may also include discovery parameter related information such as e.g. Sidelink Discovery RSRP, e.g. for candidate relay UEs 10-3, and so on. In some exemplary embodiments, the Remote UE 10-1 may also provide discovery/SL configuration related information, e.g. from primary relay UE 10-2, e.g. to the candidate relay UE 10-3 and vice-versa, b) a request to initiate/activate the multipath link setup procedure between the remote UE 10-1 and the target multi-path relay UE 10-3, c) an SL L2 ID of target multi-path relay UE 10-3, e.g. comprising a serving/target gNB-ID, d) an RSRP between target multi-path relay UE 10-3 and remote UE 10-1.

In some exemplary embodiments, e.g., when the primary relay UE 10-2 receives the multipath connection request e15, the relay UE 10-2 may e.g. accept or decline the request e15, REQ-1, see for example element e16 of FIG. 12, e.g. based on at least one of a variety of factors such as, but not limited to, a) the necessary permissions being available as its own configurations at the network, b) the existing number of remote UEs currently being served by it, c) its own SL load, d) SL-RSRP, e) Load, f) multipath connection setup latency (e.g., meaning that the multipath should be setup in a fixed, e.g. predetermined, time frame), g) the number of multipath requests received, and so on.

In some exemplary embodiments, determining e16 whether to accept or decline the request e15, REQ-1, may comprise at least one of: a) determining, for example first, if a multipath link setup procedure for the remote UE 10-1 can be performed, e.g. automatically, e.g. without any additional configuration or using/activating an on-going SL between the remote UE 10-1 and a different peer UE (not shown) which is relay capable, b) e.g., if not, the determining e16 may comprise further determining if a re-configuration of current service flow, radio bearer or logical channel between the remote UE 10-1 and a serving gNB 20 or a relay link between the primary relay UE-2 10-2 and the serving gNB 20 is required or not, further e.g. also including if re-configuration in addition to resource allocation (e.g., Configured Grants) is required.

In some exemplary embodiments, e.g., optionally, the primary relay UE 10-2 may coordinate with the network, e.g. gNB 20, to verify whether a multipath link may be allowed for the remote UE 10-1 in consideration (or, e.g., in general).

In some exemplary embodiments, the primary relay UE 10-2 and the gNB 20 can thus e.g. jointly or independently make the decision or determination e16 to accept or reject, e.g. decline, the multipath activation request e15, REQ-1 for the remote UE 10-1.

In some exemplary embodiments, a signaling for a coordination between the gNB 20 and the primary relay UE 10-2 can be, but is not limited to at least one of, e.g. dedicated, a) RRC (Radio Resource Control, e.g. Layer 3) signaling, b) PHY (Layer 1), c) MAC (Layer 2), d) packet data convergence protocol, PDCP, signals, and so on.

In some exemplary embodiments, e.g. if the primary relay UE 10-2 accepts the multipath setup request e15, REQ-1 from the remote UE 10-1, the primary relay UE 10-2 sends a multipath request acceptance message e11 to the remote UE 10-1 (e.g., similar to the first response RESP-1 of FIG. 1).

In some exemplary embodiments, e.g. if the relay UE 10-2 declines the multipath setup request e15, REQ-1, the primary relay UE 10-2 sends the multipath request decline message to the remote UE 10-1, see element e15. In other words, element e11 of FIG. 12 symbolizes a response RESP-1 of the relay UE 10-2 to the request e15, REQ-1, wherein the RESP-1 may be at least one of: a) a response accepting the request REQ-1, b) a response declining the request REQ-1.

In some exemplary embodiments, a, for example new, message may be provided for the multipath request/accept/decline message(s) REQ-1, e15, RESP-1, e11 for the purpose of multipath activation.

In some exemplary embodiments, a, for example new, information field, e.g. information element, e.g. in at least one sidelink discovery message, may be provided for implementing the multipath request/accept/decline message(s) REQ-1, e15, RESP-1, e17, or the multipath request/accept/decline message(s) REQ-1, e15, RESP-1, e11 may e.g. be included in at least one sidelink RRC message.

In some exemplary embodiments, optionally, the primary relay UE 10-2 may indicate the identity of the candidate relay UE 10-3 to the remote UE 10-1, and/or provide the necessary radio resources to communicate with/discover the candidate relay UE 10-3.

In some exemplary embodiments, optionally, the primary relay UE 10-2 may establish (e.g., if it does not exist) a sidelink connection a5 (FIG. 11) to the candidate relay UE 10-3, also see element e18 of FIG. 12, and inform the candidate relay UE 10-3, e.g. about the multipath request REQ-1, e15 of the remote UE 10-1. In some exemplary embodiments, this could e.g. be done for example when the gNB 20 setup/configure control plane/user plane via primary Relay UE 10-2 and/or if the candidate relay UE 10-3 may be another remote UE with or without Uu link a3 established.

In some exemplary embodiments, e.g., when the remote UE 10-1 receives the multipath request acceptance e11 from the primary relay UE 10-2, the remote UE 10-1 transmits a message, e.g. a multipath relay request, e19, see also the second request REQ-2 of FIG. 4, to the candidate relay UE 10-3.

In some exemplary embodiments, the message, e.g. request e19, REQ-2 may be a, for example new, message or may be a, for example new, field or information element, e.g. in at least one message as e.g. defined for a relay discovery procedure, e.g. according to some accepted standard.

In some exemplary embodiments, e.g. if the remote UE 10-1 has not previously discovered the candidate relay UE 10-3, the remote UE 10-1 may first discover the relay UE 10-3 (e.g., similar to element e14 of FIG. 12).

In some exemplary embodiments, the remote UE 10-1 and candidate relay UE 10-3 setup the sidelink between them, see e.g. element e20 of FIG. 12, e.g. using a sidelink discovery procedure, e.g. if they are not already discovered by each other.

In some exemplary embodiments, element e21 of FIG. 21 symbolizes a response to the request e19, e.g. similar to the second response RESP-2 of FIG. 7.

In some exemplary embodiments, optionally, the candidate relay UE 10-3 may e.g. coordinate with the gNB 20 to verify whether the multipath request of the remote UE-1 may be accepted.

In some exemplary embodiments, e.g. before or during the sidelink setup or after the sidelink connection is setup with the remote UE 10-1, the candidate relay UE 10-3 may send an indication or message e21 accepting the multipath request e19, REQ-2 of the remote UE 10-1 or to reject the multipath request.

In some exemplary embodiments, the response e21 from the candidate multi-path relay UE 10-3 may e.g. indicate in response to the multipath relay request message e19, REQ-2 of the remote UE 10-1 at least one of: a) a link status of the Uu link (see FIG. 11, a3) of target multi-path relay UE 10-3, and the QoS service (e.g. reliability/latency) which can be provided, b) a link status of the Uu link a3 of target multi-path relay UE 10-3, SL resources and RD-RSRP/SL RSRP info w.r.t the primary relay UE 10-2, e.g. if required.

In some exemplary embodiments, e.g., if the candidate relay UE 10-3 accepts the multipath request e19, REQ-2 of the remote UE 10-1, the, e.g. secondary, relay UE 10-3 transmits a message e22 to the gNB 20, e.g. to indicate a successful setup of the multipath relay link for the remote UE 10-1.

In some exemplary embodiments, the message e22 may e.g. include an ID (e.g., identifier or identification) of the primary relay UE 10-2 and one or more IDs of the remote UE 10-1, e.g. to allow the gNB 20 to map, e.g. in a subsequent procedure, see, for example, element e25 of FIG. 12, the new path to an existing remote-UE path, e.g. via relay UE 10-3.

In some exemplary embodiments, the message e22 or a corresponding indication IND2' (see, for example, also block 392 of FIG. 8), may be included in at least one RRC message and/or at least one UE assistance information, or it may e.g. be a, for example new, message (e.g. using, but not being limited to, at least one of L1-/L2-/L3- (layer 1/2/3) messaging).

In some exemplary embodiments, the message e22 may inform the gNB 20 that a second path exists towards the remote UE 10-1, e.g. via the secondary relay UE 10-3 (e.g., additionally to the first path via the primary relay UE 10-2).

In some exemplary embodiments, e.g. if the multipath is setup successfully, the remote UE 10-1 sends a multipath setup complete message e23 to the primary relay UE 10-2 about the successful multipath setup. In some exemplary embodiments, the message e23 may e.g. comprise an ID of the second relay terminal UE 10-3.

In some exemplary embodiments, optionally, the relay UE 10-3 may send a multipath setup complete message to the primary relay UE 10-2 (not shown). In some exemplary embodiments, this may e.g. be done if, e.g. in the meantime, the direct SL between the remote UE 10-1 and the primary relay UE 10-2 fails (e.g., sidelink RLF (radio link failure)), for example when it is indicated by the remote UE 10-1 to the relay UE 10-3.

In some exemplary embodiments, the primary relay UE 10-2 sends a multipath activation indication message e24 to the network, e.g. gNB 20. The message or indication e24 may e.g. be included in at least one RRC message or UE assistance information, or may be a, for example new, message (e.g. using, but not limited to, L1/L2/L3 layer messaging).

In some exemplary embodiments, the message e24 may include one or more of the ID of the remote UE10-1 and the ID of the multipath-relay-UE 10-3.

In some exemplary embodiments, the messages e22 and e24 of FIG. 12 may be combined, e.g. by primary or secondary/candidate relay UE 10-2, 10-3.

In some exemplary embodiments, element e25 symbolizes performing, by the gNB 20, a path configuration, e.g. duplication configuration, for the remote UE 10-1.

In some exemplary embodiments, the gNB 20 may detect that the multipath indications e22, e24 are related to the setup of alternative relay paths for remote-UE 10-1. In some exemplary embodiments, once the network 1000, e.g. gNB 20, is aware that the sidelink SL-COMM-2 (FIG. 2) is established between the remote UE 10-1 and the relay UE 10-3, the gNB 20 establishes the necessary path duplication configurations for remote UE 10-1, see element e25, as mentioned above.

In some exemplary embodiments, the remote UE 10-1 may utilize both paths to communicate with the network 1000, e.g. gNB 20, e.g. either via primary relay UE 10-2 or via candidate relay UE 10-3, e.g. either simultaneously or separately, e.g. in uplink (UL)/downlink (DL) respectively, see element e26 of FIG. 12. In some exemplary embodiments, using the multi-path link via one or more different relay UEs 10-2, 10-3, same or different type of data may be transmitted in UL and/or DL.

In the following, further exemplary aspects and embodiments according to some exemplary embodiments are disclosed, which, in some exemplary embodiments, may, either individually or in combination with each other, be combined with at least one of the exemplary aspects and embodiments explained above.

In some exemplary embodiments, e.g. for multi-path relay link setup, be it Uu/SL multipath or two or more SL relay multipath for U2U or U2N relaying, a timer TIM may be specified and/or configured, e.g. by the involved relay 10-2, 10-3 (FIG. 2, 11) or by the remote UE 10-1 or by the network 1000, e.g. via gNB 20, or jointly, within which timer TIM the multipath link setup should, e.g. must, be completed.

In some exemplary embodiments, if the timer expires, and the multi-path relay link setup is not complete, at least one of the UEs 10-1, 10-2, 10-3 may take at least one of the following actions: a) remote UE 10-1/relay UE 10-2, 10-3/ network 1000, 20 individually or jointly selecting another candidate relay UE, e.g. from a list of discovered UE, and/or selecting Uu/SL multipath or aborting the multi-path relay link setup procedure or initiating relay re-selection procedure, or the relay UE 10-2, 10-3 may change its serving gNB 20, and so on. Alternatively, in some exemplary embodiments, a multipath link setup latency threshold MP-SETUP-LAT-THRESH may also be defined.

In some exemplary embodiments, the proposed multipath relay setup procedure according to some exemplary embodiments may e.g. be used for UE-to-UE relay configurations, e.g., where a remote UE 10-1 may utilize multiple paths through two or more relay UEs 10-2, 10-3 to communicate with another sidelink remote UE (not shown).

In some exemplary embodiments, e.g. after the second relay path (e.g., via the secondary relay UE 10-3) is established, the remote UE 10-1 or the network 1000, e.g. gNB 20, may, for example flexibly, choose between either/both path to transmit data in UL/DL directions, respectively. In some exemplary embodiments, the choosing can be done for example, by indicating the path (both/single) to be chosen for the considered data transmissions.

In some exemplary embodiments, the proposed multipath setup messages according to exemplary embodiments may e.g. be used to release existing multipath connections, for example, when the data transmissions are completed for the remote UE 10-1, and/or when the single-path QoS improves beyond a certain configured QoS threshold, and/or when there are not enough resources available to support multiple/ redundant links, and so on, and/or if indicated by the gNB 20.

In some exemplary embodiments, e.g. the proposed multipath setup message e19 (FIG. 12) implicitly or explicitly may, e.g. also, be used to switch the roles between the primary relay UE 10-2 and the secondary relay UE 10-3.

In some exemplary embodiments, e.g. when a connection to the primary relay UE 10-2 is released by the remote UE 10-1, the secondary candidate relay UE 10-3 may be configured as the primary relay UE, e.g. in an implicit manner or as indicated by the controlling entity (e.g., UE 10-1/ network 1000, e.g. gNB 20).

In some exemplary embodiments, the gNB 20 may provide SL grants, e.g. for multi-path relay setup, e.g. via the relay UE 10-2, 10-3. In some exemplary embodiments, providing the SL grants may be done via the primary relay UE 10-2, but does not exclude via the candidate relay UE 10-3, e.g. if the sidelink between remote UE 10-1 and candidate relay UE 10-3 has been established or already exists.

In some exemplary embodiments, the remote UE 10-1/ relay UE 10-2 may prioritize a selection of a candidate relay UE 10-3 that is connected to the same gNB 20 as the primary relay UE 10-2.

In some exemplary embodiments, e.g. in general, the signaling for coordination between the gNB 20, remote UE 10-1, candidate relay UE 10-3 and/or the primary relay UE 10-2 can be, but is not limited to, e.g. dedicated, RRC signaling, PHY and/or MAC signaling, PDCP signals, and so on.

In some exemplary embodiments, multipath setup messages from the primary relay UE 10-2 and the candidate relay UE 10-3 to the remote UE 10-1 or to the network, e.g. gNB 20, can be combined either implicitly or through explicit coordination, e.g. between the primary relay UE 10-2 and the candidate relay UE 10-3, e.g. using, for example, dedicated RRC signaling, PHY and/or MAC signaling, PDCP signals, and so on. For example, in some exemplary embodiments, message e22 and message e24 in FIG. 12 can be combined, e.g. to reduce signaling overhead.

In some exemplary embodiments, the remote UE 10-1 may be preconfigured (see, for example, element e10 of FIG. 12), e.g. by the gNB 20 or the primary relay UE 10-2, e.g. to establish multipath relays without explicit setup procedures as exemplarily described. In some exemplary embodiments, for example, the permission to setup multipath relays can be implicit to an agreed QoS for the remote UE 10-1.

In some exemplary embodiments, e.g. upon receiving a multipath request from the remote UE 10-1 or the primary relay UE 10-2 or the candidate relay UE 10-3, the gNB 20 may provide configured grants to be used directly or indirectly via another UE/relay UE, e.g. for multipath setup and/or discovery procedures, see, for example, blocks e14, e20, and, for example, for coordination resources, e.g. between the remote UE 10-1 and the relevant relay UEs 10-2, 10-3.

Further exemplary embodiments, FIG. 13, relate to a use 500 of the method according to the embodiments and/or of the apparatus 100, 100*a*, 200, 200*a* according to the embodiments and/or of the communication system or network 1000 according to the embodiments and/or of a computer program PRG, PRG' according to the embodiments and/or of a computer-readable storage medium SM according to the embodiments and/or of a data carrier signal DCS according to the embodiments for at least one of: a) enabling 501 a sidelink multipath operation SL-MP-OP, e.g. for a user equipment-to-network, U2N, relay multipath configuration, b) setting up 502 a sidelink multipath operation SL-MP-OP, e.g. for a user equipment-to-network, U2N, relay multipath operation, c) enabling 503 a terminal device, e.g. a remote user equipment, 10-1, to be connected to a network device, e.g. gNB 20, at least temporarily using two or more relay terminal devices 10-2, 10-3, d) increasing 504 a reliability and/or a throughput for a terminal device, e.g. remote terminal device, 10-1, e) setting up 505 at least one further, e.g. second, relay terminal device 10-3, e.g. for a first terminal device, e.g. remote terminal device 10-1.

In some exemplary embodiments, the principle according to the embodiments may e.g. be used to provide mechanisms to setup a second relay UE 10-3 for a remote UE 10-1 which is currently being served by another relay UE 10-2, e.g. specifying how a multi-path link setup may work involving one or more relay UEs 10-2, 10-3, e.g. for a U2N relay scenario associated with the remote UE 10-1.

In some exemplary embodiments, the principle according to the embodiments enables to attain reliability and through-put and e.g. may provide enhancements to service continuity.

What is claimed is:

1. A computer-implemented method for a first terminal device, wherein the first terminal device conducts communications with a base station directly and indirectly, over an established first sidelink communication path, via a second terminal device that acts as a relay terminal device for the first terminal device, the method comprising the following steps:

while the established first sidelink communication path is active, transmitting, by the first terminal device, a first request to the second terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path and the established second sidelink communication path for transmission via a third terminal device, the selecting including switching of relay roles between the second terminal device and the third terminal device;

receiving, by the first terminal device, a first response to the first request from the second terminal device;

transmitting, by the first terminal device, a second request to the third terminal device, the second request indicating that the second sidelink communication path between the third terminal device and the first terminal device should be activated for the sidelink multipath operation; and setting up, by the first terminal device, the second sidelink communication path between the third terminal device and the first terminal device.

2. The method according to claim 1, comprising either or both of:

a) determining, by the first terminal device, whether the sidelink multipath operation should be activated in which the third terminal device serves as a further relay terminal device; and b) performing, by the first terminal device, a discovery procedure for discovering the third terminal device for serving as the further relay terminal device.

3. The method according to claim 2, further comprising: determining, by the first terminal device, that setup of the sidelink multipath operation is required.

4. The method according to claim 1, further comprising one or both of the following two steps of:

a) receiving, by the first terminal device, a second response to the second request from the third terminal device; and b) performing, by the first terminal device, an operation based at least on the second response.

5. The method according to claim 4, further comprising any one or more of the following steps:

a) transmitting, by the first terminal device, an indication to the second terminal device indicating a status associated with the sidelink multipath operation including whether a setup of the sidelink multipath operation is completed;

b) receiving, by the first terminal device, an indication from the second terminal device that the first terminal device should perform a multipath relay selection; and c) performing, by the first terminal device, at least some aspects of a multipath setup procedure jointly with the second terminal device to establish a multipath link with the third terminal device.

6. A computer-implemented method of a second terminal device that serves a first terminal device as a relay over an established first sidelink communication path through which the first terminal device conducts indirect communications with a base station, the method comprising the following steps:

while the established first sidelink communication path is active, receiving, by the second terminal device, a first request from the first terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device;

transmitting, by the second terminal device and to the first terminal, a first response to the first request; and performing, by the second terminal device, at least some aspects of a multipath setup procedure jointly with the first terminal device to establish a multipath link with the third terminal device.

7. The method according to claim 6, further comprising: determining, by the second terminal device, the first response, wherein the determining includes either:

a) determining the first response independently of another entity including a network device; or b) determining the first response jointly with the network device using explicit signaling with the network device.

8. The method according to claim 6, further comprising any one or more of the following six steps:

a) determining, by the second terminal device, whether the sidelink multipath operation should be activated;

b) performing, by the second terminal device, a discovery and/or sidelink setup associated with the second terminal device and the third terminal device;

c) receiving, by the second terminal device, an indication from the first terminal device indicating a status associated with the sidelink multipath operation including whether a setup of the sidelink multipath operation is completed;

d) transmitting, by the second terminal device, an indication to a network device indicating a status associated with the sidelink multipath operation including whether a setup of the sidelink multipath operation is completed;

e) receiving, by the second terminal device, an indication from a network device that the first terminal device should perform a multipath relay selection; and f) transmitting, by the second terminal device, an indication to the first terminal device that the first terminal device should perform a multipath relay selection based on receiving the indication from the network device.

9. A computer-implemented method of a third terminal device, the method comprising the following steps:

a) receiving, by the third terminal device, a second request from a first terminal device while an established first sidelink communication path, which is between the first terminal device and a second terminal device that serves the first terminal device as a relay terminal device for indirect communications between the first terminal device and a base station, is active, wherein:

the first terminal device conducts further communications directly with the base station;

the first terminal device transmits, while the established first sidelink communication path is active, a first request to the second terminal device via a sidelink interface using a first sidelink communication over the established first sidelink communication path requesting activation of the sidelink multipath operation;

the first terminal device receives, from the second terminal device, a first response to the first request prior to transmitting the second request to the third terminal device;

the second request indicates that a second sidelink communication path between the third terminal device and the first terminal device should be activated as part of a sidelink multipath operation requested by the first terminal device via the established first sidelink communication path, the sidelink multipath operation including establishing the second sidelink communication path in response to the second request; and the sidelink multipath operation includes a message being transmitted between the first terminal device and the base station indirectly by selecting between the established first sidelink communication path via the second terminal device and the established second sidelink communication path via the third terminal device, the selecting including switching of relay roles between the second terminal device and the third terminal device;

b) participating, by the third terminal device with the first terminal device, in setting up the second sidelink communication path between the third terminal device and the first terminal device; and c) transmitting, by the third terminal device and to the first terminal device, a second response to the second request.

10. The method according to claim 9, comprising any one or more of the following steps:

a) performing, by the third terminal device, either or both of a discovery and a sidelink setup associated with the second terminal device and the third terminal device;

b) transmitting, by the third terminal device, an indication to a network device indicating a status associated with the sidelink multipath operation including whether a setup of the sidelink multipath operation is completed; and c) serving, by the third terminal device, the first terminal device as a relay terminal device associated with the sidelink multipath operation.

11. A first terminal device configured to conduct communications with a base station directly and indirectly over an established first sidelink communication path via a second terminal device that serves the first terminal device as a relay terminal device, the first terminal device comprising:

a wireless communication interface;

a processing system that includes at least one processor; and a memory on which are stored instructions that are executable by the processing system and that, when executed by the processing system, cause the processing system to:

while the established first sidelink communication path is active, transmit a first request to the second terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device;

receive a first response to the first request from the second terminal device;

transmit a second request to the third terminal device, the second request indicating that the second sidelink communication path between the third terminal device and the first terminal device should be activated for the sidelink multipath operation; and set up the second sidelink communication path between the third terminal device and the first terminal device.

12. An apparatus for a first terminal device, wherein the first terminal is configured to conduct communications with a base station directly and indirectly over an established first sidelink communication path via a second terminal device that serves the first terminal device as a relay terminal device, the apparatus comprising:

a wireless communication interface;

a processing system that includes at least one processor; and a memory on which are stored instructions that are executable by the processing system and that, when executed by the processing system, cause the processing system to:

while the established first sidelink communication path is active, transmit a first request to the second terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device;

receive a first response to the first request from the second terminal device;

transmit a second request to the third terminal device, the second request indicating that the second sidelink communication path between the third terminal device and the first terminal device should be activated for the sidelink multipath operation; and set up the second sidelink communication path between the third terminal device and the first terminal device.

13. A computer-implemented method of a network device that supports communications between a first terminal device and a base station, the first terminal device conducting communications with the base station directly and indirectly over a first sidelink communication path via a second terminal device that serves the first terminal device as a relay terminal device, the method comprising:

determining, by the network device, a first response to be transmitted to the first terminal device by the second terminal device, responsive to the second terminal device receiving, while the established first sidelink communication path is active, a first request from the first terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device; and causing the second terminal device to transmit the first response to the first terminal device, triggering the first terminal device to perform the sidelink multipath operation including transmitting a second request to a third terminal device and establishing a second sidelink communication path between the first terminal device and the third terminal device.

14. A network device that supports communications between a first terminal device and a base station, the first terminal device conducting communications with the base station directly and indirectly over a first sidelink communication path via a second terminal device that serves the first terminal device as a relay terminal device, the network device comprising:

at least one communication interface;

a processing system that includes at least one processor; and at least one memory storing instructions that, when executed by the processing system, cause the processing system to:

determine a first response to be transmitted to the first terminal device by the second terminal device, responsive to the second terminal device receiving, while the established first sidelink communication path between the first terminal device and the second terminal device is active, a first request from the first terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device; and conduct a transmission with the second terminal device over the at least one communication interface, which causes the second terminal device to transmit the first response to the first terminal device, triggering the first terminal device to perform the sidelink multipath operation including transmitting a second request to a third terminal device and establishing a second sidelink communication path between the first terminal device and the third terminal device.

15. An apparatus for a network device, wherein the network device supports communications between a first terminal device and a base station, the first terminal device conducting communications with the base station directly and indirectly over a first sidelink communication path via a second terminal device that serves the first terminal device as a relay terminal device, the apparatus comprising:

at least one communication interface;

a processing system that includes at least one processor; and at least one memory storing instructions that, when executed by the processing system, cause the processing system to:

determine a first response to be transmitted to the first terminal device by the second terminal device, responsive to the second terminal device receiving, while the established first sidelink communication path between the first terminal device and the second terminal device is active, a first request from the first terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device; and conduct a transmission with the second terminal device over the at least one communication interface, which causes the second terminal device to transmit the first response to the first terminal device, triggering the first terminal device to perform the sidelink multipath operation including transmitting a second request to a third terminal device and establishing a second sidelink communication path between the first terminal device and the third terminal device.

16. A communication system, comprising:

a first terminal device that conducts communications directly with a base station and indirectly with the base station over an established first sidelink communication path and via a second terminal device that acts as a relay terminal device for the first terminal device, wherein the first terminal device is configured to:

while the established first sidelink communication path is active, transmit a first request to the second terminal device via a sidelink interface using a first sidelink communication over the established first sidelink communication path, wherein the first request requests activation, for the first terminal device, of a sidelink multipath operation, including establishing, in response to the first request, a second sidelink communication path, and wherein the sidelink multipath operation includes the first terminal device continuing to conduct communications with the base station and in which a message is transmitted between the first terminal device and the base station indirectly by selecting between the established first sidelink communication path for transmission via the second terminal device and the established second sidelink communication path for transmission via a third terminal device, the selecting including switching of relay roles between the second terminal device and the third terminal device;

receive a first response to the first request from the second terminal device;

transmit a second request to the third terminal device, the second request indicating that the second sidelink communication path between the third terminal device and the first terminal device should be activated for the sidelink multipath operation; and set up the second sidelink communication path between the third terminal device and the first terminal device.

* * * * *